United States Patent
Cain et al.

(10) Patent No.: US 7,992,840 B2
(45) Date of Patent: Aug. 9, 2011

(54) PRESSURE RATED OIL FIELD GATE VALVE

(75) Inventors: David Earl Cain, New Braunfels, TX (US); Jeremy David Cain, New Braunfels, TX (US)

(73) Assignee: T-3 Property Holdings, Inc., Houston, TX (US)

( * ) Notice: Subject to any disclaimer, the term of this patent is extended or adjusted under 35 U.S.C. 154(b) by 478 days.

(21) Appl. No.: 12/248,610

(22) Filed: Oct. 9, 2008

(65) Prior Publication Data

US 2009/0095934 A1 Apr. 16, 2009

Related U.S. Application Data

(60) Provisional application No. 60/979,022, filed on Oct. 10, 2007, provisional application No. 60/979,025, filed on Oct. 10, 2007.

(51) Int. Cl.
*F16K 3/00* (2006.01)

(52) U.S. Cl. ........................... 251/328; 251/326

(58) Field of Classification Search .................. 251/326, 251/327, 328, 329, 193, 195
See application file for complete search history.

(56) References Cited

U.S. PATENT DOCUMENTS

| | | | |
|---|---|---|---|
| 4,223,868 A | 9/1980 | Humes et al. | |
| 4,645,179 A * | 2/1987 | Ali | 251/327 |
| 4,682,757 A | 7/1987 | Shelton | |
| 5,727,775 A * | 3/1998 | Rodger et al. | 251/328 |
| 6,260,822 B1 * | 7/2001 | Puranik | 251/328 |
| 6,279,875 B1 * | 8/2001 | Chatufale | 251/174 |
| 6,782,918 B2 | 8/2004 | Rousselin | |
| 7,562,859 B2 * | 7/2009 | Lam et al. | 251/195 |

OTHER PUBLICATIONS

International Search Report for Corresponding International Patent Application No. PCT/US2008/079341.
Written Opinion for Corresponding International Patent Application No. PCT/US2008/079341.

* cited by examiner

*Primary Examiner* — John Fristoe, Jr.
(74) *Attorney, Agent, or Firm* — Locke Lord Bissell & Liddell LLP

(57) ABSTRACT

The disclosure provides an efficient design for a pressure rated oil field gate valve that meets the challenges of providing a quality product with minimal increase in price due to the design. It minimizes weight increase in the valve body over valves not meeting strict pressure specifications, due to strengthening ribs at strategic places without having to increase the overall body size as in commonplace in the industry. It provides redundancy of seals with minimal costs and no change in seat pockets over valves not capable of meeting the higher standards. It provides multiple shear points along a valve stem that can still allow a user to operate the valve from external to the valve bonnet. It further provides for additional sealing of the valve bonnet to the valve body by using elasticity in metal over long lengths to maintain a compression seal between the bonnet and the body.

36 Claims, 14 Drawing Sheets

PRESSURE RATED OIL FIELD GATE VALVE

CROSS REFERENCE TO RELATED APPLICATIONS

This application claims the benefit of U.S. Provisional Application Nos. 60/979,022 and 60/979,025, both filed Oct. 10, 2007, which are incorporated herein by reference.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO APPENDIX

Not applicable.

BACKGROUND

1. Field of the Invention

The disclosure relates to oil field equipment, and particularly to oil field gate valves, such as those valves meeting pressurization specifications.

2. Description of Related Art

As in most realms, the oil field market is influenced by safety concerns balanced against cost and value for products and services. To control the minimum safety requirements, regulations and specifications are promulgated in the oil field industry, so that customers can purchase equipment necessary for projects with the expectation that the equipment will meet certain standards. Known and respected specifications for oil field equipment are promulgated by the American Petroleum Institute ("API") that requires valves to meet rigorous tests. A significant focus is on valves and similar control devices, because of the dangers of oil field wells that are controlled by valves. One specific specification is API 6A PSL-2 PR2 for product specification level and performance requirements. A valve has to pass certain tests as virtually leak proof for an extended period of time for a gaseous medium at elevated pressures (that is, generally 5,000 psi and above) and elevated temperatures (generally 250° F. and above). The challenge is to design a valve that can meet such rigorous tests in the industry that is affordable to customers and competitive to the marketplace.

Standard design engineering for such valves generally increases the overall cross-sectional diameters and thicknesses of the valve body to add mass to the valve for increased pressure requirements and performance. The valve acts as a pressure vessel and must withstand not only the pressure, but must be stiff enough to minimize the engineering strain at stress levels to maintain alignment of the valve components which must seal, connect, rotate, translate up and down, and otherwise function for their intended purpose all without leakage at critical junctures. Most valves in the market place reflect this standard practice of adding more mass to the overall size, even though a significant portion of the valve cost is directly related to simply the amount of material in the valve body. Another common practice is to increase larger cavities for larger seals, which in turn causes increased cross-sections of the valve body, which leads to the above referenced increase in material and costs. Another practice is to rely on metal-to-metal seals, because at PR2 pressures and temperatures, rubber and elastomeric seals may extrude and fail. However, as the valve ages, the surface finish of the mating surfaces deteriorates and the valves can leak, decreasing its useful life. The challenge is to include additional sealing while keeping costs to a minimum.

These challenges have been met in various ways by the industry. Generally, the remedy is to meet the engineering tests such as the API 6A PSL-2 PR2 referenced above even at an additional cost of materials, attempt to negotiate competitive prices from suppliers of the additional components, increase manufacturing efficiency, contract offshore to other suppliers, and demand an incremental price increase.

Therefore, there remains a need to provide an improved valve that can meet such specifications and tests that are still competitive in the marketplace.

BRIEF SUMMARY

The disclosure provides an efficient design for a pressure rated oil field gate valve that meets the challenges of providing a quality product with minimal increase in price due to the design. It minimizes weight increase in the valve body over valves not meeting strict pressure specifications, due to strengthening ribs at strategic places without having to increase the overall body size as in commonplace in the industry. It provides redundancy of seals with minimal costs and no change in seat pockets over valves not capable of meeting the higher standards. It provides multiple shear points along a valve stem that can still allow a user to operate the valve from external to the valve bonnet. It further provides for additional sealing of the valve bonnet to the valve body by using elasticity in metal over long lengths to maintain a compression seal between the bonnet and the body.

The disclosure provides a gate valve, comprising: a valve body having a flow passage from a first port to a second port with a gate cavity disposed between the first port and the second port, the gate cavity intersecting the flow passage; a valve bonnet coupled to the valve body with a bonnet opening; a gate slidably coupled to the valve body in the gate cavity, the gate adapted to slidably move at an angle to a centerline of the flow passage to block the flow when the gate is in a closed position to cover a cross-sectional area of the flow passage and allow flow when the gate is at least in a partially open position when the gate does not entirely cover the cross-sectional area of the flow passage; a stem rotatably coupled through the bonnet opening to the gate and adapted to move the gate reciprocally across the cross-sectional area of the flow passage between the closed and open positions; a seat pocket disposed on each side of the gate cavity in the valve body, the seat pocket having a bore that forms an outer perimeter of the seat pocket and a back face in the valve body distal from the gate cavity to create a stepped surface around the flow passage; and a seat disposed in each seat pocket and adapted to seal between the gate and the valve body. The seat comprises: a seat body having: a flow opening aligned with the flow passage; a gate face disposed toward the gate; a perimeter surface adapted to fit into the bore of the seat pocket; and a rear face disposed toward the back face of the seat pocket, the rear face comprising a first metal radial sealing surface having a shaped sealing surface and adapted to seal against the back face of the seat pocket in metal-to-metal contact.

The disclosure also provides a gate valve, comprising: valve body having a flow passage from a first port to a second port with a gate cavity disposed between the first port and the second port, the gate cavity intersecting the flow passage, the valve body further comprising at least two ribs extending from a portion of the valve body distant from the valve bonnet to a portion of the valve body external to the flow passage, a first rib being disposed toward the first port and a second rib being disposed toward the second port; a valve bonnet coupled to the valve body with a bonnet opening; a gate slidably coupled to the valve body in the gate cavity, the gate adapted to slidably move at an angle to the centerline of the flow passage to block the flow when the gate is in a closed position to cover a cross-sectional area of the flow passage and allow flow when the gate is at least in a partially open position when the gate does not entirely cover the cross-sectional area of the flow passage; a stem rotatably coupled through the bonnet opening to the gate and adapted to move the gate reciprocally across the cross-sectional area of the flow passage between the closed and open positions; a seat pocket disposed on each side of the gate cavity in the valve body, the seat pocket having a bore that forms an outer perimeter of the seat pocket and a back face in the valve body distal from the gate cavity to create a stepped surface around the flow passage; and a seat disposed in each seat pocket and adapted to seal between the gate and the valve body.

The disclosure further provides a gate valve, comprising: a valve body having a flow passage from a first port to a second port with a gate cavity disposed between the first port and the second port, the gate cavity intersecting the flow passage; a valve bonnet coupled to the valve body with a bonnet opening; a gate slidably coupled to the valve body in the gate cavity, the gate adapted to slidably move at an angle to a centerline of the flow passage to block the flow when the gate is in a closed position to cover a cross-sectional area of the flow passage and allow flow when the gate is at least in a partially open position when the gate does not entirely cover the cross-sectional area of the flow passage; a stem rotatably coupled through the bonnet opening to the gate and adapted to move the gate reciprocally across the cross-sectional area of the flow passage between the closed and open positions; a seat pocket disposed on each side of the gate cavity in the valve body, the seat pocket having a bore that forms an outer perimeter of the seat pocket and a back face in the valve body distal from the gate cavity to create a stepped surface around the flow passage; and a seat disposed in each seat pocket and adapted to seal between the gate and the valve body. The seat comprises: a seat body having: a flow opening aligned with the flow passage; a gate face disposed toward the gate; a perimeter surface adapted to fit into the bore of the seat pocket, the perimeter surface having a peripheral groove extending toward a centerline of the seat body; a rear face disposed toward the back face of the seat pocket; and a flexible castellated seal disposed in the peripheral groove of the seat body, the castellated seal having a series of castellations on a first face, the first face being disposed toward the gate face of the seat body of the seat.

The disclosure still further provides a gate valve, comprising: a valve body having a flow passage from a first port to a second port with a gate cavity disposed between the first port and the second port, the gate cavity intersecting the flow passage, the valve body further comprising at least two ribs extending from a portion of the valve body distant from the valve bonnet to a portion of the valve body external to the flow passage, a first rib being disposed toward the first port and a second rib being disposed toward the second port, wherein the ribs form an angled surface from a central portion of the valve body toward the first port and the second port at an angle to a centerline through the first port and second port; a valve bonnet coupled to the valve body with a bonnet opening; a gate slidably coupled to the valve body in the gate cavity, the gate adapted to slidably move at an angle to the centerline of the flow passage to block the flow when the gate is in a closed position to cover a cross-sectional area of the flow passage and allow flow when the gate is at least in a partially open position when the gate does not entirely cover the cross-sectional area of the flow passage; a stem rotatably coupled through the bonnet opening to the gate and adapted to move the gate reciprocally across the cross-sectional area of the flow passage between the closed and open positions; a seat pocket disposed on each side of the gate cavity in the valve body, the seat pocket having a bore that forms an outer perimeter of the seat pocket and a back face in the valve body distal from the gate cavity to create a stepped surface around the flow passage; and a seat disposed in each seat pocket and adapted to seal between the gate and the valve body. The seat comprises: a seat body having: a flow opening aligned with the flow passage; a gate face disposed toward the gate; a perimeter surface adapted to fit into the bore of the seat pocket, the perimeter surface having a peripheral groove extending toward a centerline of the seat body; a rear face disposed toward the back face of the seat pocket, the rear face comprising a rear cylindrical groove and a first metal radial sealing surface formed on the rear face adjacent the rear cylindrical groove, the first metal radial sealing surface being adapted to seal against the back face in metal-to-metal contact as a first seal, and the rear face further comprising a second metal radial sealing surface formed on the rear face adjacent the rear cylindrical groove and distal from the first metal radial sealing surface relative to the rear cylindrical groove, the second metal radial sealing surface adapted to seal against the back face in metal-to-metal contact as a second seal, wherein at least one of the metal radial sealing surfaces comprises a shaped sealing surface; and a peripheral step formed in the perimeter surface adjacent the rear face; a rear flexible seal disposed in the cylindrical groove of the rear face and adapted to seal against the back face as a third seal; and a flexible castellated seal disposed in the peripheral groove of the seat body, the castellated seal having a series of castellations on a first face, the first face being disposed toward the gate face of the seat body of the seat, the flexible castellated seal forming a fourth seal.

The disclosure provides a gate valve, comprising: a valve body having a flow passage from a first port to a second port with a gate cavity disposed between the first port and the second port, the gate cavity intersecting the flow passage; a valve bonnet coupled to the valve body with a bonnet opening; a gate slidably coupled to the valve body in the gate cavity, the gate adapted to slidably move at an angle to a centerline of the flow passage to block the flow when the gate is in a closed position to cover a cross-sectional area of the flow passage and allow flow when the gate is at least in a partially open position when the gate does not entirely cover the cross-sectional area of the flow passage; a stem rotatably coupled through the bonnet opening to the gate and adapted to move the gate reciprocally across the cross-sectional area of the flow passage between the closed and open positions; a seat pocket disposed on each side of the gate cavity in the valve body, the seat pocket having a bore that forms an outer perimeter of the seat pocket and a back face in the valve body distal from the gate cavity to create a stepped surface around the flow passage; and a seat disposed in each seat pocket and adapted to seal between the gate and the valve body. The seat comprises: a seat body having: a flow opening aligned with the flow passage; a gate face disposed toward the gate; a perimeter surface adapted to fit into the bore of the seat pocket; a rear face disposed toward the back face of the seat pocket; and a peripheral step formed in the perimeter surface adjacent the rear face; and a flexible peripheral seal disposed around the peripheral step formed in the perimeter surface. The flexible peripheral seal comprises: a jacket having a heel portion of flexible material of a longitudinal thickness and a groove formed in an outer periphery of the jacket, having at least two peripherally extending seal arms; and a peripheral spring disposed in the jacket groove, the peripherally extending seal arms being biased to a width, measured from an outside surface of one seal arm to an outside surface of the other seal arm, that is greater than the heel longitudinal thickness.

The disclosure also provides a gate valve, comprising: a valve body having a flow passage from a first port to a second port with a gate cavity disposed between the first port and the second port, the gate cavity intersecting the flow passage, the valve body further comprising at least two ribs extending from a portion of the valve body distant from the valve bonnet to a portion of the valve body external to the flow passage, a first rib being disposed toward the first port and a second rib being disposed toward the second port, wherein the ribs form an angled from a central portion of the valve body toward the first port and the second port at an angle to a centerline through the first port and second port; a valve bonnet coupled to the valve body with a bonnet opening; a gate slidably coupled to the valve body in the gate cavity, the gate adapted to slidably move at an angle to the centerline of the flow passage to block the flow when the gate is in a closed position to cover a cross-sectional area of the flow passage and allow flow when the gate is at least in a partially open position when the gate does not entirely cover the cross-sectional area of the flow passage; a stem rotatably coupled through the bonnet opening to the gate and adapted to move the gate reciprocally across the cross-sectional area of the flow passage between the closed and open positions; a seat pocket disposed on each side of the gate cavity in the valve body, the seat pocket having a bore that forms an outer perimeter of the seat pocket and a back face in the valve body distal from the gate cavity to create a stepped surface around the flow passage; and a seat disposed in each seat pocket and adapted to seal between the gate and the valve body. The seat comprises: a seat body having: a flow opening aligned with the flow passage; a gate face disposed toward the gate; a perimeter surface adapted to fit into the bore of the seat pocket, the perimeter surface having a peripheral step formed in the perimeter surface adjacent the rear face; a rear face disposed toward the back face of the seat pocket, the rear face comprising a rear cylindrical groove and a first metal radial sealing surface formed on the rear face adjacent the rear cylindrical groove and adapted to seal against the back face in metal-to-metal contact as a first seal, and the rear face further comprising a second metal radial sealing surface formed on the rear face adjacent the rear cylindrical groove and distal from the first metal radial sealing surface relative to the rear cylindrical groove, the second metal radial sealing surface adapted to seal against the back face in metal-to-metal contact as a second seal, wherein at least one of the metal radial sealing surfaces comprises a shaped sealing surface; and a rear flexible seal disposed in the cylindrical groove of the rear face and adapted to seal against the back face as a third seal; and a flexible peripheral seal disposed around the peripheral step formed in the perimeter surface adjacent the rear surface, the flexible peripheral seal forming a fourth seal. The flexible peripheral seal comprises: a jacket having a heel portion of flexible material of a longitudinal thickness and a groove formed in an outer periphery of the jacket, having at least two peripherally extending seal arms; and a peripheral spring disposed in the jacket groove, the peripherally extending seal arms being biased to a width, measured from an outside surface of one seal arm to an outside surface of the other seal arm, that is greater than the heel longitudinal thickness.

DETAILED DESCRIPTION

The Figures described above and the written description of specific structures and functions below are not presented to limit the scope of what Applicants have invented or the scope of the appended claims. Rather, the Figures and written description are provided to teach any person skilled in the art to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present inventions will require numerous implementation-specific decisions to achieve the developer's ultimate goal for the commercial embodiment. Such implementation-specific decisions may include, and likely are not limited to, compliance with system-related, business-related, government-related, and other constraints, which may vary by specific implementation, location and from time to time. While a developer's efforts might be complex and time-consuming in an absolute sense, such efforts would be, nevertheless, a routine undertaking for those of skill in this art having benefit of this disclosure. It must be understood that the inventions disclosed and taught herein are susceptible to numerous and various modifications and alternative forms. Lastly, the use of a singular term, such as, but not limited to, "a," is not intended as limiting of the number of items. Also, the use of relational terms, such as, but not limited to, "top," "bottom," "left," "right," "upper," "lower," "down," "up," "side," and the like are used in the written description for clarity in specific reference to the Figures and are not intended to limit the scope of the invention or the appended claims.

Figure 1:
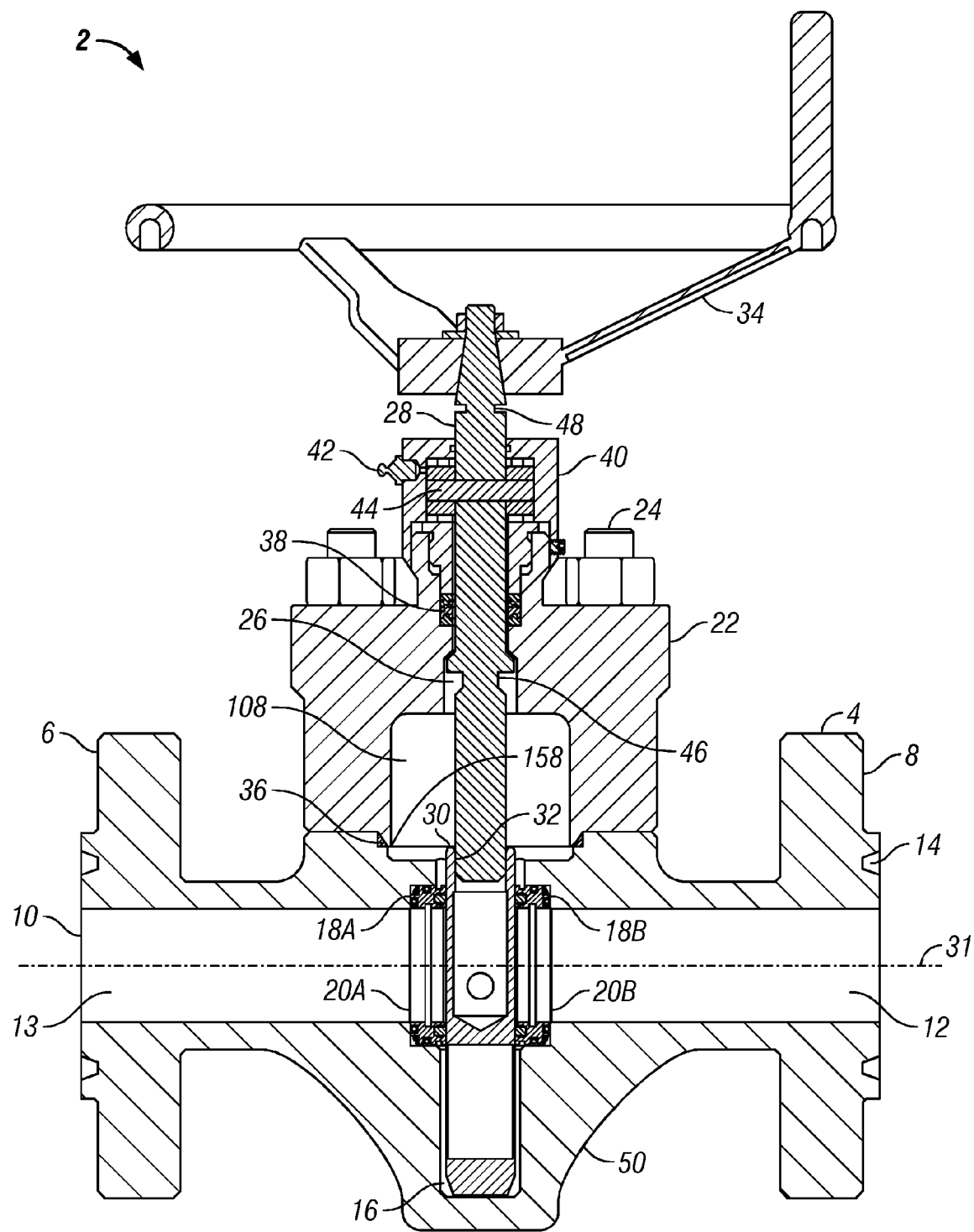
FIG. 1 is a schematic cross-sectional view of an exemplary embodiment of a gate valve described herein.

FIG. 1 is a schematic cross-sectional view of an exemplary embodiment of a gate valve described herein. The gate valve 2 generally includes a body 4 having a pair of flanges 6, 8 at each end of the body. A first port 10 is formed on one end of the body and a second port 12 is formed on another end. Generally, the ports are aligned and, in any case, form a flow passage 13 therebetween having a centerline 31. The flanges include a seal surface 14 for placement of a flange seal (not shown) to enable sealing between an adjacent flange and connecting equipment. Other types of connections can be formed, although flanges are common for the pressure ratings of such valves. The valve body 4 includes a gate cavity 16 disposed between the first port and the second port, so that the gate cavity intersects the flow passage 13. Generally, the gate cavity 16 is disposed perpendicular to the flow passage 13, although other angles can be used. The gate cavity contains a gate 30 to be described below that blocks the flow passage and controls flow therethrough. To effectively block flow through the flow passage, a seat 20 is generally disposed on each side of the gate cavity and gate. A seat pocket 18 is formed in the flow passage 13 to contain the seat 20. Generally, the seat 20 will have an opening size commensurate with the flow passage 13. In the orientation of the exemplary embodiment shown in FIG. 1, a seat pocket 18A is formed on a left side of the gate cavity 16 and a seat pocket 18B is formed on a right side of the gate cavity, so that the gate can translate up and down in the gate cavity between the seats 20A and 20B, respectively, disposed therein. Further details of the seat and seat pocket will be described below.

Relative to the orientation in FIG. 1 of the valve, an upper portion of the valve is generally termed a bonnet 22. The bonnet 22 is attached to the valve body 4 through a plurality of bonnet bolts 24. A bonnet cavity 108 is created between the valve body and the internal portion of the bonnet that is fluidicly coupled to a gate cavity 16. A bonnet opening 26 is formed in the bonnet 22 through which a stem 28 is assembled. The stem 28 can be rotated in the bonnet 22 and move the gate 30 up and down in the gate cavity 16. The movement is caused by rotation of a threaded surface 32 formed between the gate and the stem such that rotation of the stem effectively moves the gate along the threaded surfaces in a translating motion. In the embodiment shown, the movement of a gate is at a perpendicular angle to the centerline 31 formed through the flow passage 13, although the angle can vary if so designed. The stem can be rotated by an actuator 34. Generally, an actuator can be a hand wheel, level, motor-driven gear, or other movable elements. A bonnet-to-body seal 36 is disposed between the bonnet 22 and the valve body 4 to generally eliminate leakage to the outside of the valve. A packing 38 is disposed around the stem 28 to generally eliminate leakage upward through the opening 26 in the bonnet 22. A cap 40 is mounted over the stem with one or more other seals between the bonnet 22 and the stem 28. A grease fitting 42 is generally included in the cap 40 to lubricate bearings, the stem, various contact surfaces, and the like.

A shear pin 44 is inserted through an opening in the stem 28 and a bearing adjacent the stem. The shear pin 44 helps to protect the stem from breaking internal to the bonnet 22 when extraordinarily high stresses are placed on the stem. Generally, a smaller cross-sectional area of the stem is created in manufacturing the threaded engagement surface 32 on the stem due to a thread relief This smaller cross-section creates a weakened section in the stem from the manufacturing process. The shear pin 44 is designed to fail in shear to protect the stem 28 from breaking at the thread relief 46 internal to the bonnet 22, where the shear pin can be more readily accessed through the cap 40 and replaced as necessary. The exemplary embodiment of the valve includes a further groove, herein a stem groove 48, to further protect the stem from breakage, if the stem shear pin 44 does not break in accordance with its design load. More details are provided below.

Further, the valve body 4 includes ribs 50, described in more detail below, that help stiffen the valve body to maintain alignment of various valve components and structure under high stress loads. These ribs are provided in contrast to generally accepted teachings for valve design by not significantly increasing the overall mass of the valve body to create such stiffness.

Figure 2:
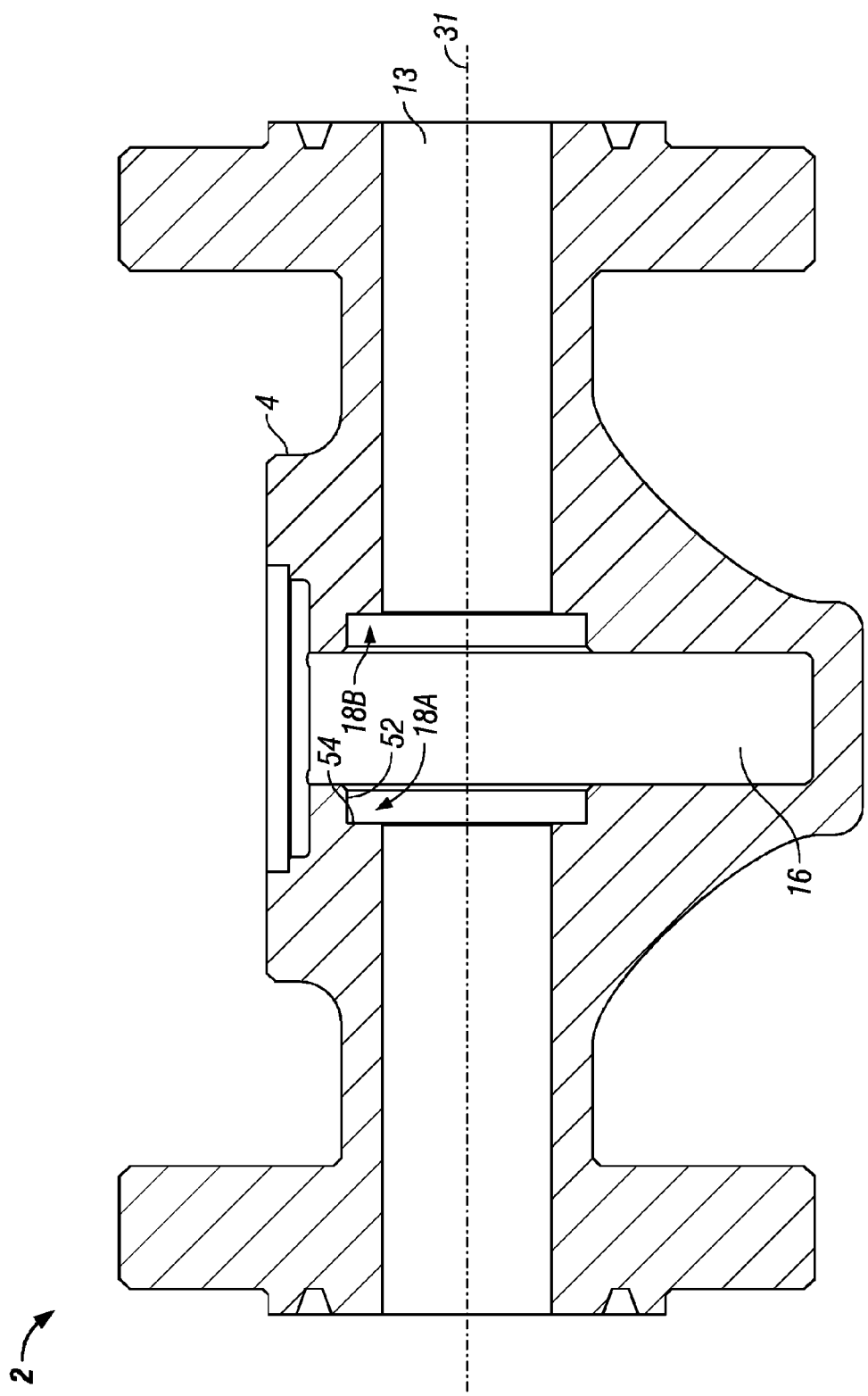
FIG. 2 is a schematic cross-sectional view of a portion of a valve body of the gate valve of FIG. 1 illustrating valve seat pockets.

FIG. 2 is a schematic cross-sectional view of a portion of a valve body of the gate valve of FIG. 1 illustrating valve seat pockets. The valve 2 and particularly the valve body 4, includes the flow passage 13 with a centerline 31 formed therethrough. The seat pocket 18, such as a first seat pocket 18A and a second seat pocket 18B, is formed along the flow passage in the valve body on both sides of the gate cavity 16. For purposes herein, the seat pocket 18 includes a bore 52 with an outer perimeter and a back face 54, where the term "rear" is intended to include a surface distal from the gate or gate cavity, and the term "forward" is intended to include a surface toward the gate or gate cavity.

Figure 3:
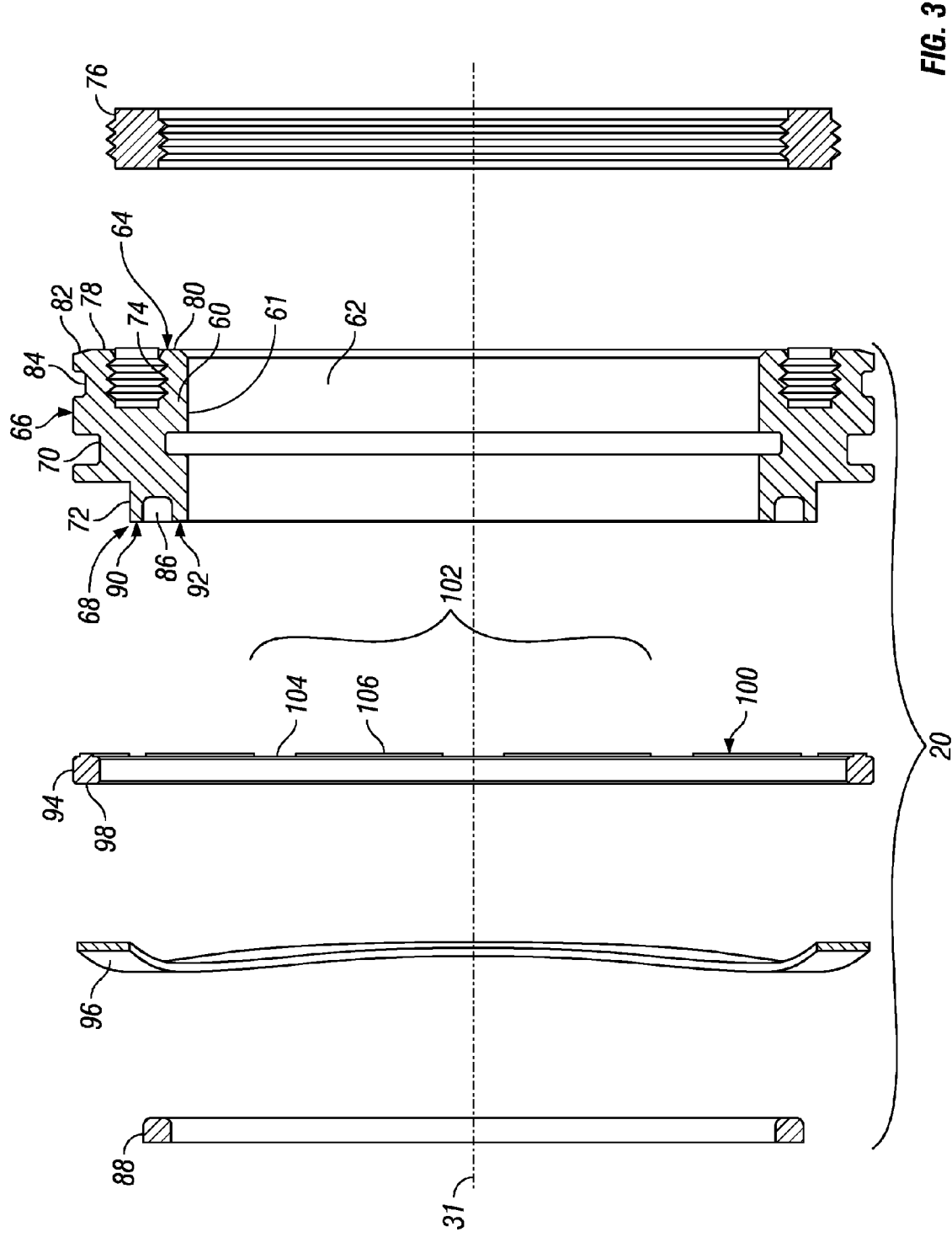
FIG. 3 is a schematic cross-sectional assembly view of an exemplary embodiment of a valve seat.
Figure 3A:
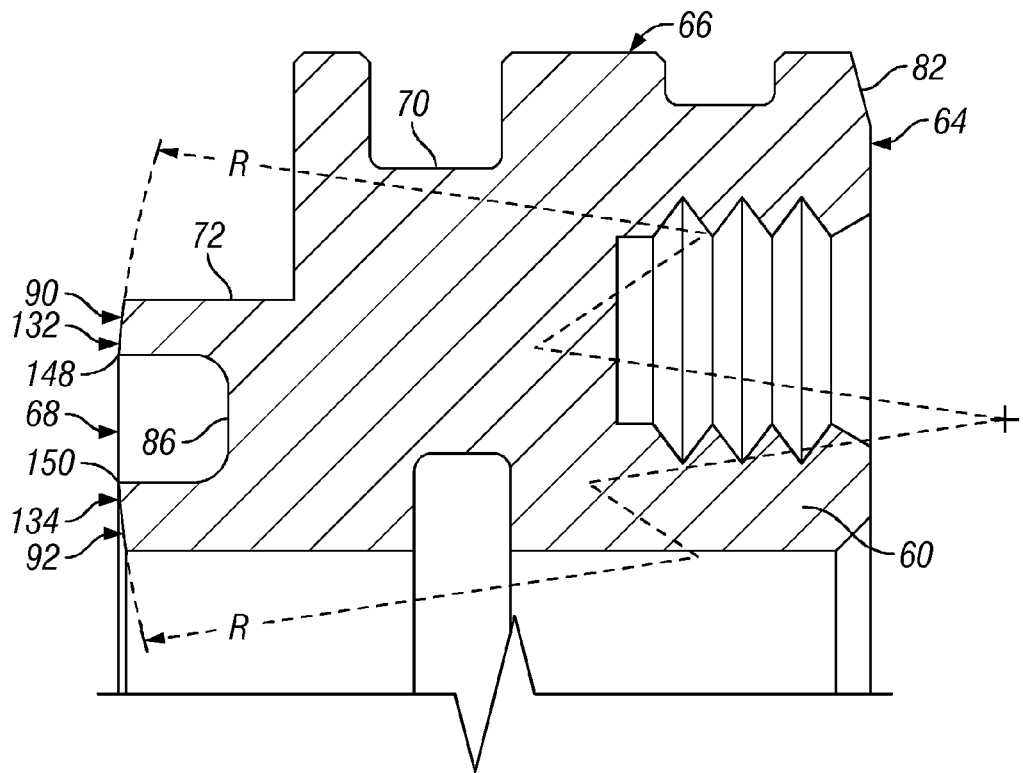
FIG. 3A is a schematic cross-section view of a portion of a seat body.
Figure 3B:
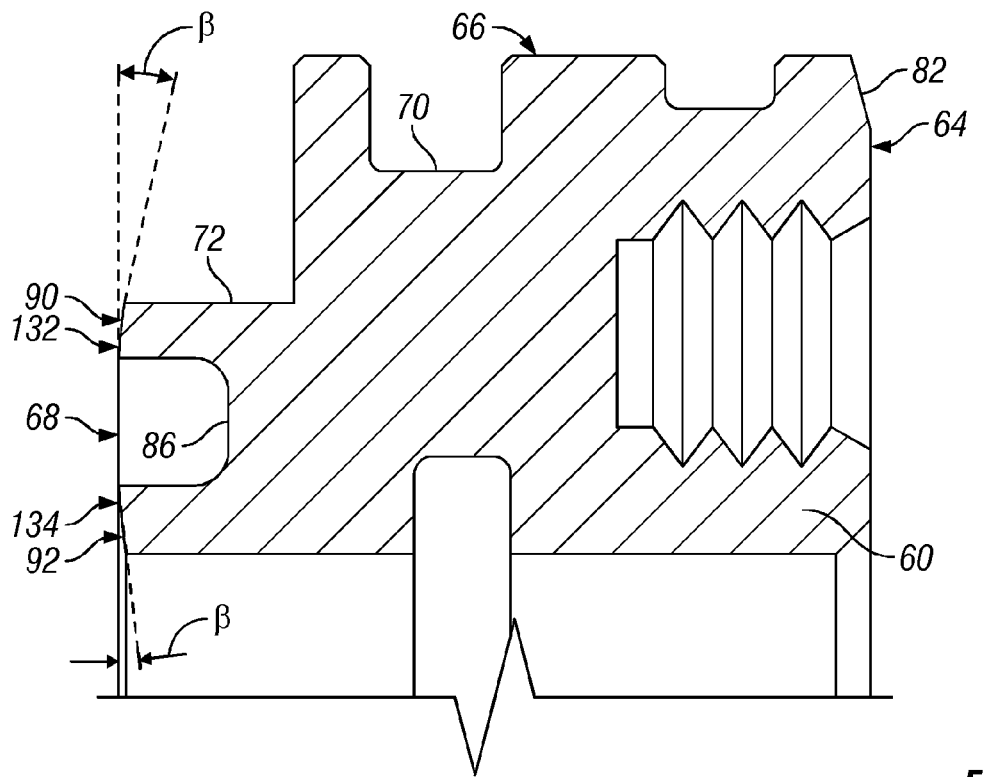
FIG. 3B is a schematic cross-section view of a portion of an alternative seat body.

FIG. 3 is a schematic cross-sectional assembly view of an exemplary embodiment of a valve seat. FIG. 3A is a schematic cross-section view of a portion of a seat body. FIG. 3B is a schematic cross-section view of a portion of an alternative seat body. The figures will be described in conjunction with each other. The seat described can meet the API 6A tests for at least a 5,000 PSI rated pressure valve. The seat 20 generally includes a seat body and various seals assembled thereof In the orientation shown in FIG. 3, the seat 20 corresponds to the orientation of the seat 20A described and shown in FIG. 1. The seat 20B is generally a mirror image of the seat 20A with the orientation reversed, so that corresponding surfaces face forward toward the gate to interact therewith. The seat 20 includes a seat body 60 of generally a cylindrical shape having an inner perimeter 61 forming a flow opening 62 approximately equal to the flow passage 13 along the centerline 31 shown and described in FIG. 1. The seat body generally includes a gate face 64 disposed toward the gate 30 described in FIG. 1. The seat body further includes a perimeter surface 66 that is disposed radially outward toward the outer perimeter of the bore 52 described in FIG. 2. The seat body 60 further includes a rear face 68 disposed toward the back face 54 of the seat pocket 18, also shown in FIG. 2.

More specifically, the gate face 64 includes a gate cylindrical groove 74 formed in the gate face. A gate flexible seal 76 is assembled and mounted to the gate face in the gate cylindrical groove 74. The gate flexible seal 76 can be made of a variety of materials and generally of materials that reduce the slidable friction between the seat 20 and the gate 30. One exemplary and non-limiting material is PTFE, also known as Teflon. An outer metal surface 78 disposed radially outward from the gate cylindrical 74 forms an axial stop to the movement of the seat to the gate along the centerline 31. A portion 82 of the outer metal surface 78 can be tapered or formed with a radius to help guide the gate 30 as it translates up and down past the seat 20 in the orientation shown. An inner metal surface 80, disposed radially inward toward the centerline 31 can be further to used to support the flexible seal 76 in a perimeter and provide a stop to the relative movement between the seat and the gate.

The perimeter surface 66 of the seat body 60 includes a peripheral groove 70 formed in the perimeter surface and having walls on either side of the groove from the seat body. Further, a peripheral step 72 is formed toward the rear face 68 and intersects the rear face, so that the peripheral step has one wall of the seat body in the direction of the gate face. A groove 84 can also be formed in the peripheral surface of the seat body for maintenance purposes, mainly, to assist in disassembly of the seat 20 from the seat pocket 18, shown in FIG. 1.

The rear face 68 includes a rear cylindrical groove 86, so that a rear flexible seal 88 can be disposed therein. The rear flexible seal 88 forms a flexible seal that can enable sealing even if the back face 54 of the seat pocket 18 should become rough from use and deterioration, or contaminants be disposed thereon. A metal radial sealing surface 90 is disposed radially around the rear face. Without limitation, the metal radial sealing surface 90 can be formed outward from the rear cylinder groove 86 away from the centerline 31. The metal radial sealing surface 90 forms a metal seal by establishing metal-to-metal contact with the back face 54 of the seat pocket 18. Similarly, a second metal radial sealing surface 92 can be similarly formed around the rear face. Without limitation, the metal radial sealing surface 92 can be formed inward from the rear cylinder groove 86 toward the centerline 31.

One or more of the metal radial sealing surfaces 90, 92 can be shaped to establish one or more shaped sealing surfaces 132, 134, respectively. The shaped sealing surfaces can be formed with a radius R, as shown in FIG. 3A, or tapered at an angle β, as shown in FIG. 3B. For example and without limitation, the radius R can be 1"-2" from a center point aligned with the middle of the rear cylindrical groove 86, more advantageously 1.4"-1.6", and an angle β can be 2°-10°, more advantageously 3°-5°, and any radius or angle therebetween inclusively. The resulting leading edges 148, 150 of the shaped sealing surfaces 132, 134 can first contact the back face 54 to establish a concentrated load and a more effective seal over a smaller cross-sectional area than without the shaped sealing surfaces. The contacting area of a shaped sealing surface that contacts the back face of the seat pocket can be self-adjusting by deforming the leading edge as necessary under high stress loads until the contacting surface area has deformed enough to support a sealing load caused by the contact force between the metal sealing surface and the back face to establish an equilibrium condition, and yet minimize the contacting area required to support the load to help maintain an effective seal.

In FIG. 3, a flexible castellated seal 94 is sized to be disposed into the peripheral groove 70 formed in the perimeter surface 66 of the seat body. The castellated seal with castellations 102 having merlons 106 adjacent crenels 104 will be described in more detail in reference to FIG. 4 and its function in FIG. 5. A wave spring 96 can be disposed in the peripheral step 72. The wave spring 96 biases the seat 20 away from the back face 54 of the seat pocket 18 and toward the gate 30 disposed in the gate cavity 16, shown in FIGS. 1 and 2.

Figure 4:
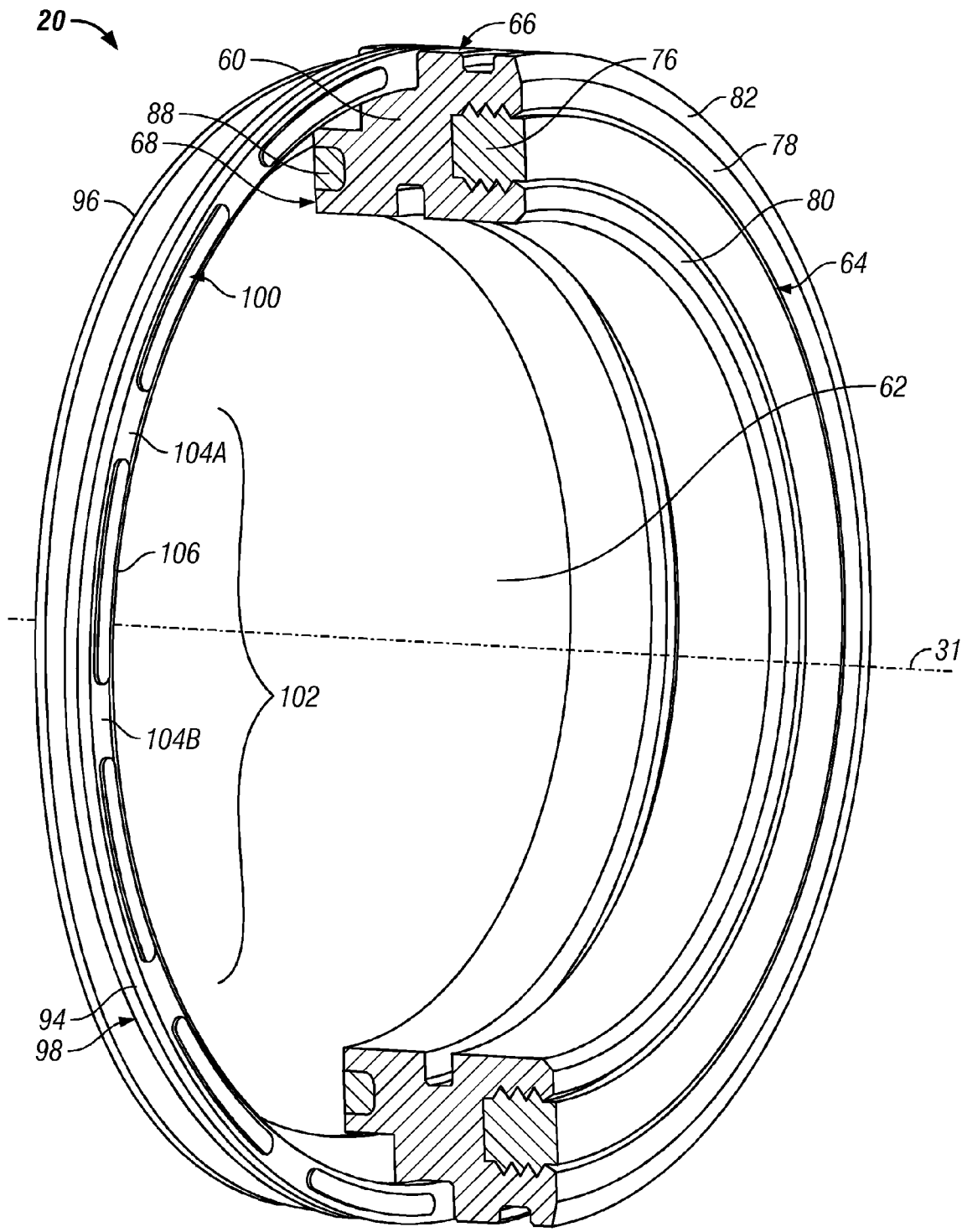
FIG. 4 is a schematic perspective view of the assembled valve seat.

FIG. 4 is a schematic perspective view of the assembled valve seat. The seat body 60 and the assembled seals form the seat 20. The gate face 64 is disposed toward the gate 30 in FIG. 1 and provides a smooth surface for the gate to translate across the gate space. The perimeter surface 66 contains one or more seals, such as the flexible castellated seal 94, and the rear face 68 generally includes one or more metal-to-metal seals through one or more metal radial sealing surfaces and the rear flexible seal 88 to further enhance sealing for deteriorated surfaces.

The castellated seal 94 includes one or more castellations 102. A castellation is formed by an axially extended portion known as a merlon 106 adjacent a crenel 104 and generally between two crenels. The castellations of the castellated seal are disposed on a forward facing surface 100 that is disposed toward the gate face 64 of the seat 20 and the gate 30 of FIG. 1. The rear surface 98 of the castellated seal 94 that is disposed toward the rear face 68 of the seat 20 generally includes a smooth seal that is noncastellated. As will be described in FIG. 5, the castellated seal effectively creates an inexpensive one-way seal that allows upstream leakage and downstream sealing for the gate valve.

Figure 5:
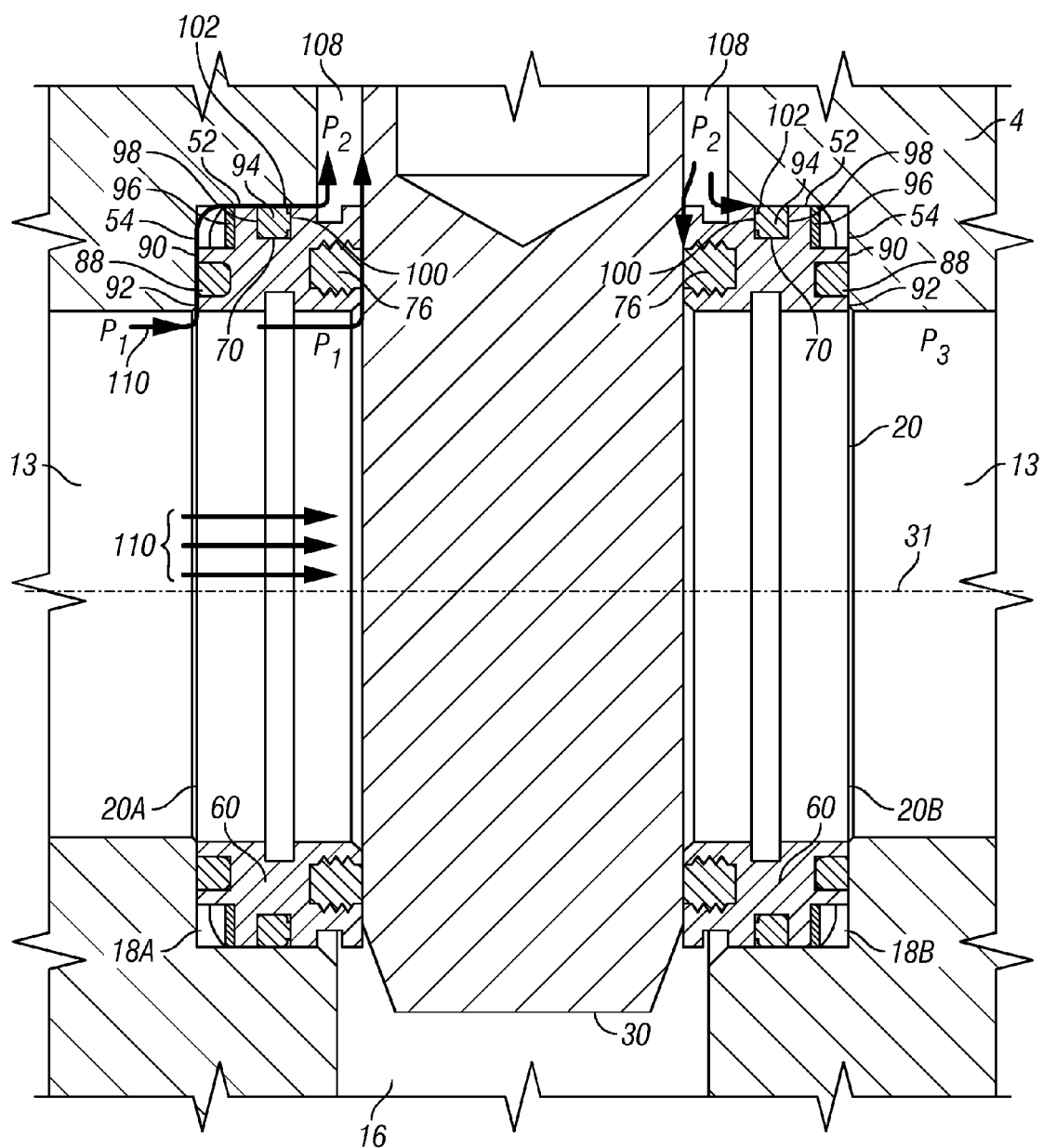
FIG. 5 is a schematic cross-sectional view of the valve body with the valve seats installed in the valve seat pockets.

FIG. 5 is a schematic cross-sectional view of the valve body with the valve seats installed in the valve seat pockets. FIG. 5 illustrates the relative flow with the sealing functions of the seats disposed on both sides of the gate 30. As described above, the valve body 4 includes a gate 30 that translates across the flow passage 13 to control the flow through the flow passage 13. To meet the required standards, such as the API 6A specifications referenced above, the seat 20 must seal between the seat pocket and the gate under rigorous conditions. While certain third party designs have offered various solutions, the solutions generally are an expensive arrangement. The present system is a simplified and inexpensive solution.

In general, the seat 20A is disposed in the seat pocket 18A on the left side of the gate 30 and seat 20B is disposed on the right side of the gate in the seat pocket 18B, using the orientations for illustrative purposes shown in FIG. 5. With a gate in a downward position, so that it blocks the flow passage 13 and fluid 110 therethrough, a small amount of fluid at pressure P1 leaks past the seat 20A into the bonnet cavity 108. This intentional leakage helps equalize the forces on both sides of the seat 20A in the seat pocket 18A and reduces a sealing force from the upstream seat to the gate 30. The reduced sealing force on the upstream side of the gate at the higher pressure P1 allows a lower force to open the gate as it slides across the face of the seat 20A. Further, the pressure P1 equalizes (with relatively minor pressure drops) with the pressure P2 in the bonnet cavity 108. The bonnet cavity 108 is fluidly coupled to the right side of the gate above the seat pocket 18B, so that the pressure P2 on the right side of the gate in FIG. 2 is equal to the pressure P2 on the left side. The mirror image orientation of the seat 20B in the seat pocket 18B and the reverse orientation of the seals compared to the seat 20A creates a seal so that the fluid at pressure P2 is prevented from leaking downstream of the seat 20B into the downstream portion of the flow passage 13 at pressure P3.

Thus, the upstream seat 20A leaks intentionally and the downstream seat 20B seals intentionally (in the orientations of the fluid flow shown). If the flow was reversed, so that seat 20B became the upstream seat and seat 20A became the downstream seat, the result would be the mirror image where the upstream seat 20B would leak and the downstream seat 20A would seal. The simplicity of this design and yet the ability to seal in such fashion is caused by astute orientation and selection of the various components described here.

More specifically, the pressure P1 in conjunction with the action of the wave spring 96 forces the seat 20A toward the gate 30. The metal-to-metal contact of the metal radial sealing surface 90 or the metal radial sealing surface 92 or both is not effectively engaged to seal against the back face 54. Similarly, the rear flexible seal 88 is not effectively engaged to seal against the back face 54 and thus fluid at pressure P1 leaks past the three seals. The fluid at pressure P1 then encounters the flexible castellated seal 94. However, with the orientation shown in FIG. 4, the rear surface 98 is pushed away from the adjacent wall of the peripheral groove 70 and does not seal in the groove 70, and allows fluid at pressure P1 (ignoring any losses in pressure along the way) to flow through the castellations 102, specifically, the crenels 104, of the castellated seal 94 and leak past the castellated seal 94. The crenels 104 cannot seal because the merlons 106 keep the crenels 104 from sealing against adjacent wall of the peripheral groove 70. Thus, the fluid at pressure P1 leaks past the seat 20A into the bonnet cavity 108 at substantially the same pressure to established pressure P2 downstream of the seat 20A.

However, on the right side of FIG. 5, the downstream seat 20B, effectively seals the fluid at pressure P2 from flowing farther downstream into the remaining flow path. The fluid flows at pressure P2 along the surfaces between the bore 52 and the perimeter surface 66 of the seat 20B. However, this time due to the mirror image placement of the seals, the flow passes first through the crenels 104 of the castellations 102 and encounters the rear surface 98 of the castellated seal 94. The pressure P2 forces the rear surface 98 against the downstream wall of the peripheral groove 70 and effectuates a seal thereon. The flow is stopped. If any flow should inadvertently leak past the seal 94 on the rear surface 98, the fluid will encounter a metal radial sealing surface 90 that is sealing in metal-to-metal contact against the back face 54 of the seat pocket 18B. The metal-to-metal contact is enhanced by the pressure P2 forcing the seat 20B against the back face 54 of a seat pocket 18B. Further, the rear flexible seal 88 is also being forced against the back face 54 for another sealing surface. Finally, the metal radial sealing surface 92 that is disposed radially inward from the seal 88 is also being forced against the back face 54 of the seat pocket 18B. Thus, the seat 20B in one embodiment includes four sealing surfaces to help prevent leakage of fluids downstream of the seat 20B.

Figures 6, 6A:
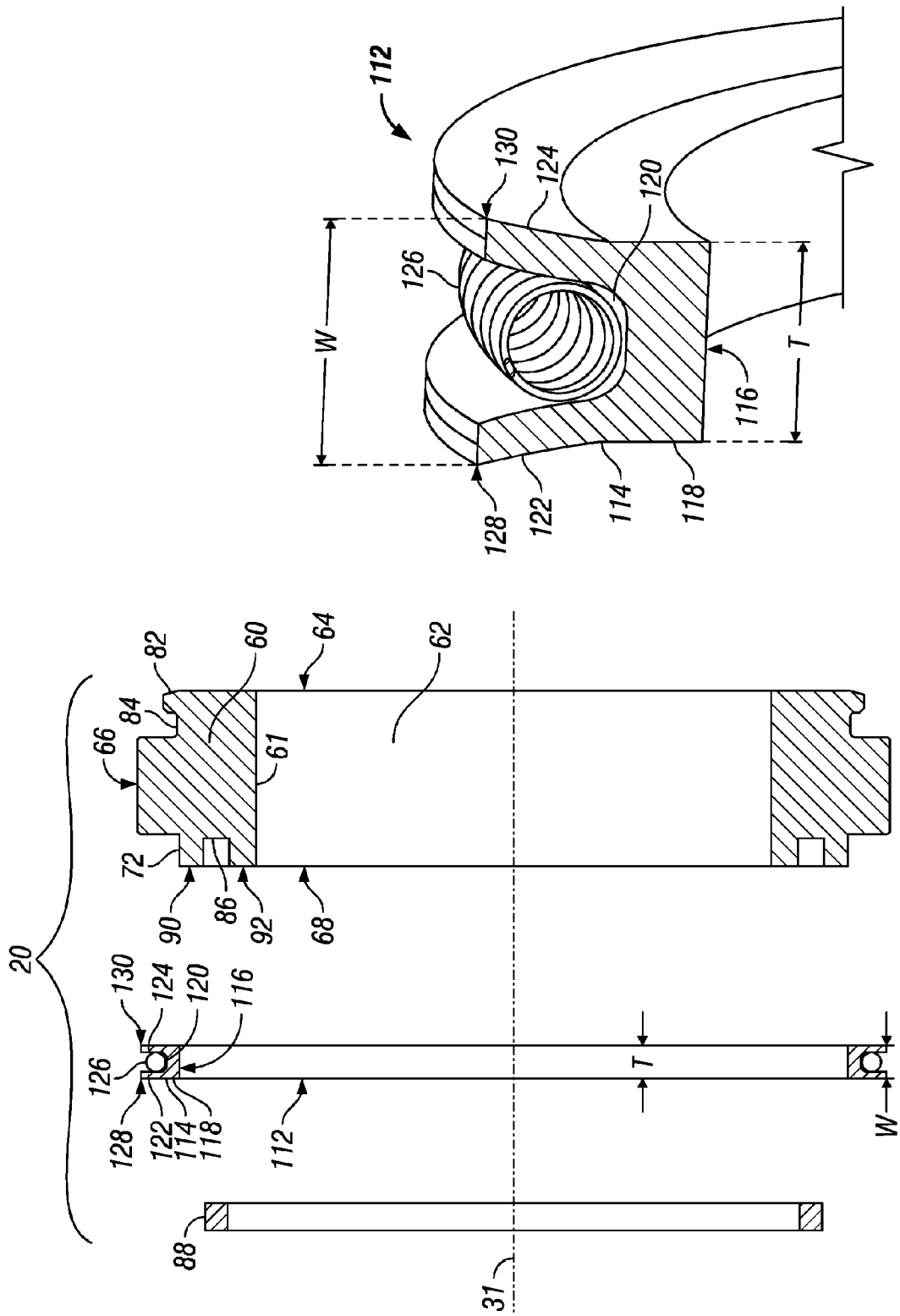
FIG. 6 is a schematic cross-sectional assembly view of another exemplary embodiment of a valve seat.
FIG. 6A is a schematic cross-sectional view of a portion of a flexible peripheral seal.
Figure 7:
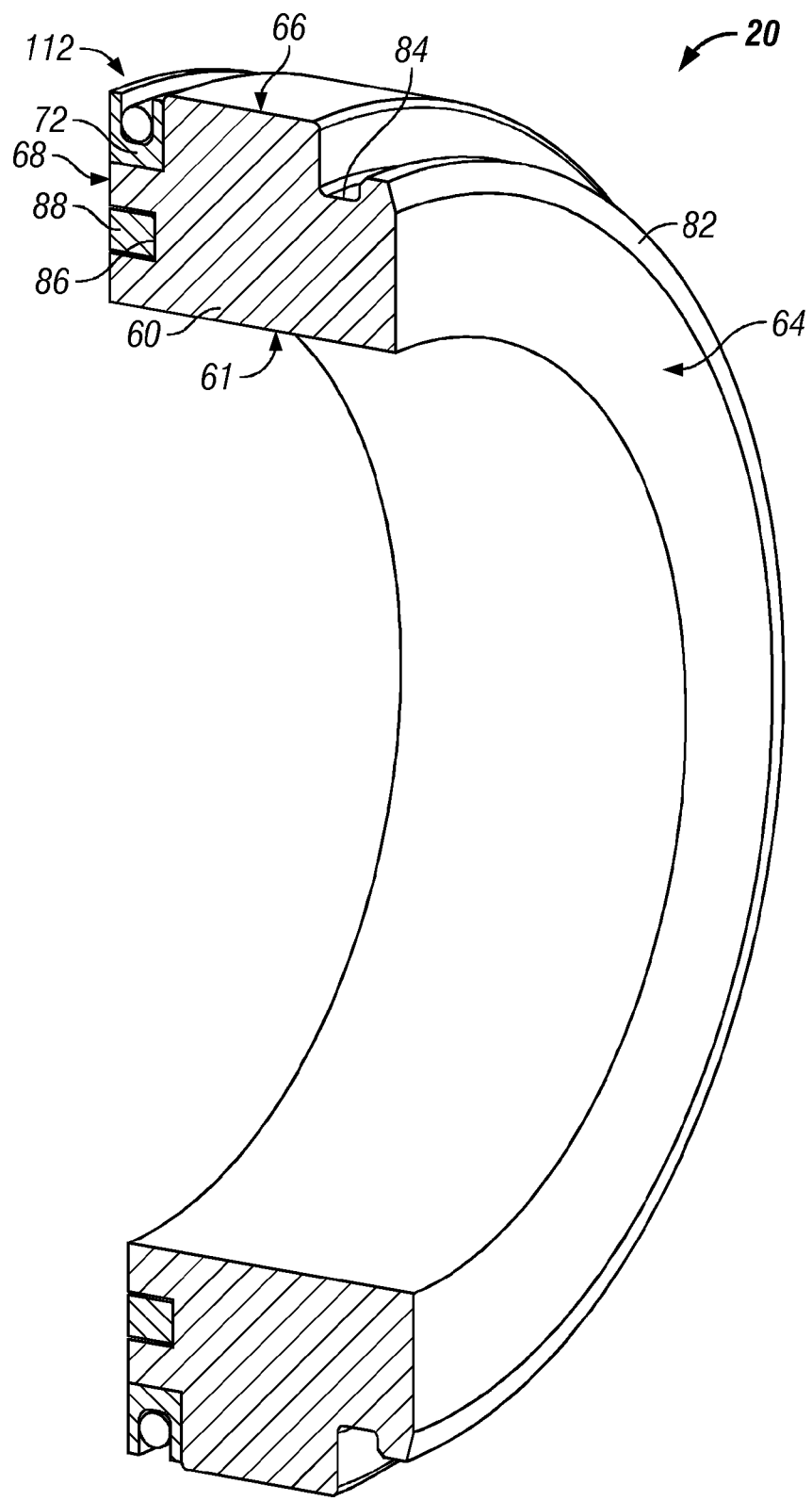
FIG. 7 is a schematic perspective view of the assembled valve seat shown in FIG. 6.

FIG. 6 is a schematic cross-sectional assembly view of another exemplary embodiment of a valve seat. FIG. 6A is a schematic cross-sectional view of a portion of a flexible peripheral seal. FIG. 7 is a schematic perspective view of the assembled valve seat shown in FIG. 6. The figures will be described in conjunction with each other. This embodiment of the valve seat 20 is designed for higher pressures than the seat shown in FIGS. 3-5. Because of the higher pressures, a different design can be utilized more efficiently. Higher pressures include 10,000 PSI and qualify for meeting the API 6A test described above for a 10,000 PSI rated pressure valve. The seat body 60 includes an inner perimeter 61 that forms a flow opening 62 through the seat 20. The seal body 60 includes a gate face 64, perimeter surface 66, and rear face 68. The gate face 64 generally includes a metal surface that is disposed adjacent the gate 30 described above. The gate face 64 can include a tapered or radius portion 82 to assist in aligning the gate as the gate encounters the gate face 64 in its traversal. A groove 84 can be included for disassembly on the perimeter surface 66. A peripheral step 72 can be formed in the perimeter surface 66 adjacent to the rear face 68. In this seat body 60, the peripheral step 72 can be used to efficiently support a peripheral seal 112 that can seal to the periphery of the seat pocket 18 and/or the back face 54 of the seat pocket. The seat body 60 can further include a rear cylinder groove 86 formed in the rear face 68. A metal radial sealing surface 90 disposed radially outward from the rear cylindrical groove 86 can form a metal-to-metal seal against the back face 54 of the seat pocket 18 described above. Similarly, a metal radial sealing surface 92 can form a metal-to-metal seal against the back face 54 in additional to or in lieu of the metal radial sealing surface 90. The seat shown in FIG. 6 is aligned according to the orientation of the seat 20A described above. A rear flexible seal 88 can be disposed in the rear cylindrical groove 86 to similarly seal as described above for the seat of FIGS. 3-5.

The peripheral seal 112 generally includes a jacket 114 of flexible material. The jacket 114 includes an inner peripheral surface 116 that is sized to fit over the diameter of the peripheral step 72. The jacket generally includes a cross-sectional shape that has a radial portion termed a "heel" 118. The heel 118 has a longitudinal thickness "T" relative to the centerline 31. A groove 120 is formed in the peripheral seal 112 radially outward from the heel 118. The groove 120 can form a U-shaped cross-section so that a peripheral spring 126 that can be stretched and assembled thereto. The peripheral spring 126 can be a coil spring. The peripheral spring 126 can also be a spring with a cross-section generally in the shape of a "U". Generally, the open portion of the "U" will be placed facing radially away from the centerline of the seal. The groove 120 formed in the peripheral seal 112 creates a first arm 122 and a second arm 124 with the spring disposed at least partially therebetween. The arms 122 and 124 peripherally extend radially outward from the heel 118. The arms are biased to a width W that is greater than the thickness T of the heel, when the width is measured from an outside surface 128 of one arm to an outside surface 130 of the other arm 124. The outward bias assists in biasing the seat 20 toward the gate 30 described above.

Figure 8:
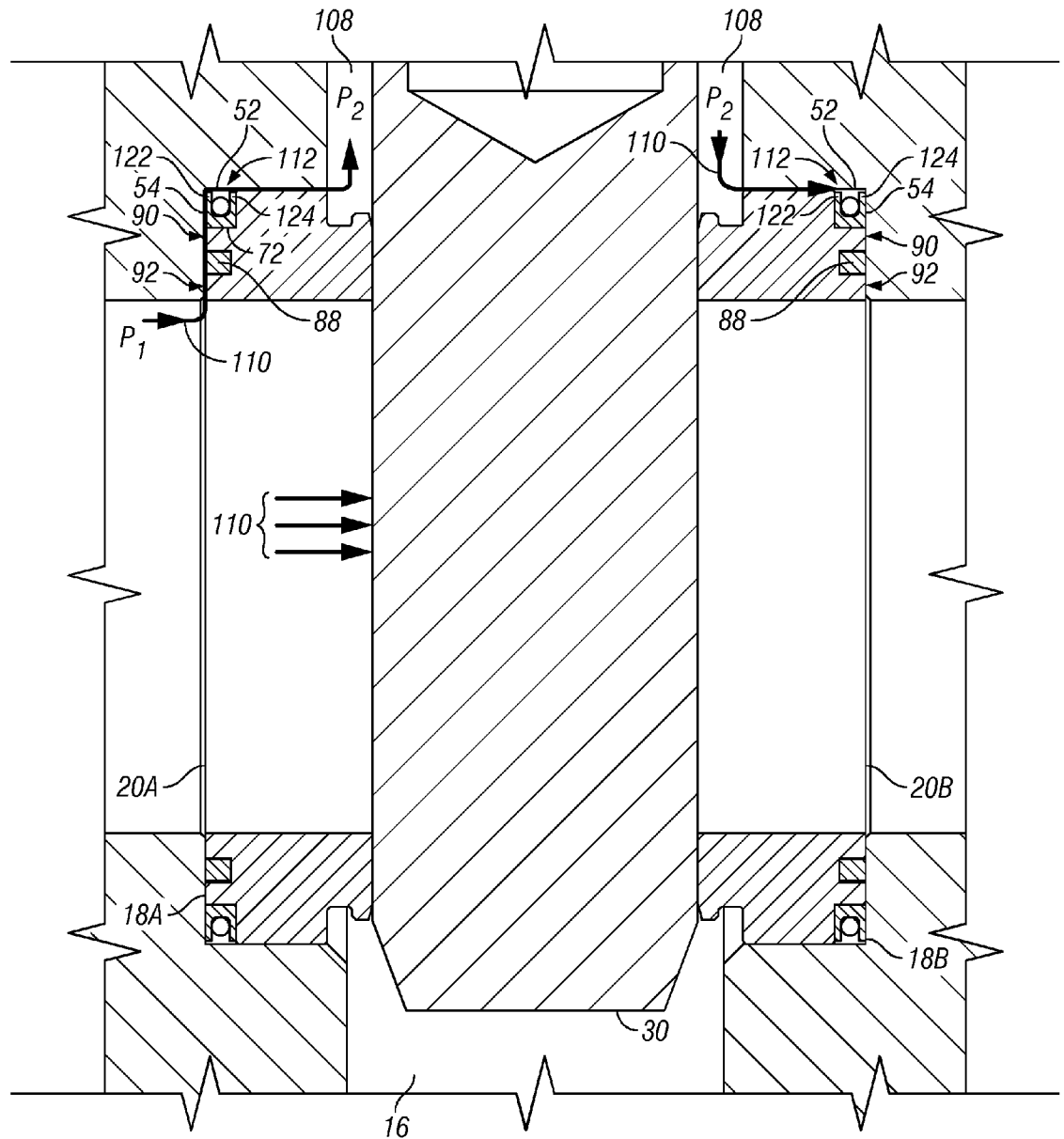
FIG. 8 is a schematic cross-sectional view of the valve body with the valve seats installed in the valve seat pockets.
Figure 8A:
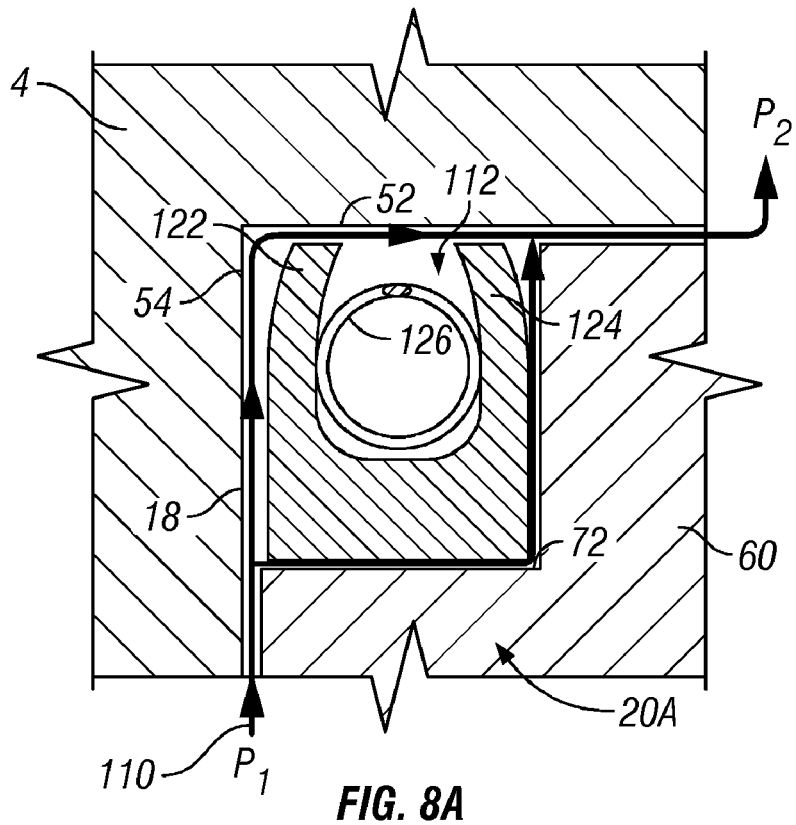
Figure 8B:
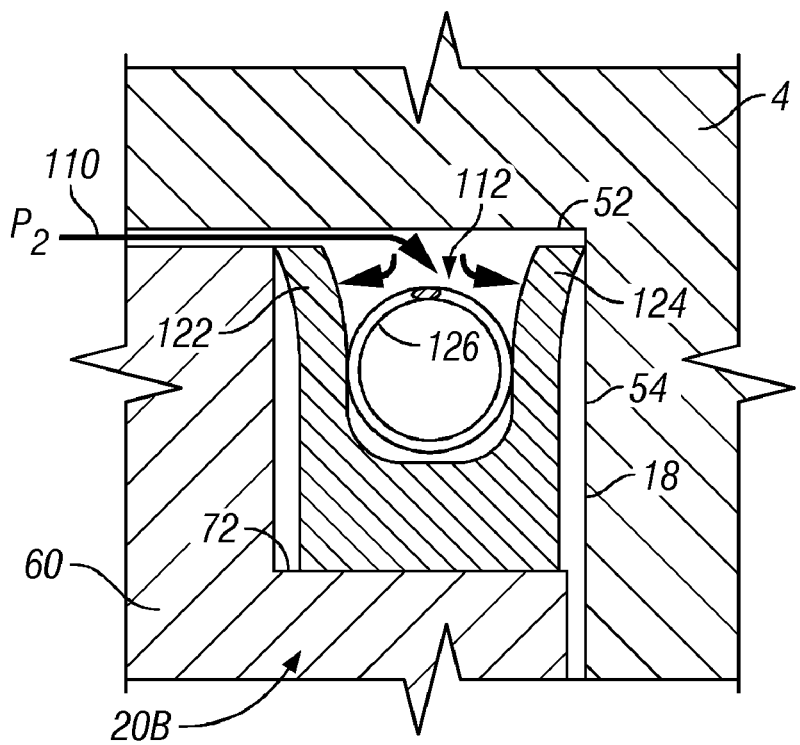

FIG. 8 is a schematic cross-sectional view of the valve body with the valve seats of FIG. 6 installed in the valve seat pockets. The flow in FIG. 8 is similar to the flow described above for FIG. 5 and has similar results in that the upstream seat is designed to bypass a certain amount of fluid under pressure to equalize the pressure between the gate 30 and the upstream seat 20A, and yet restrict pressure from passing downstream of the downstream seat 20B. More specifically, the valve body 4 includes a seat body 18A into which a seat 20A is disposed, and a seat pocket 18B into which a seat 20B is disposed. In the flow direction 110 illustrated in FIG. 7 from left to right, the seat 20A is the upstream seat and the seat 20B is the downstream seat. The seats are mirror images of each other, so that the gate face of each as described above faces the gate from opposite directions. The pressure P1 of a fluid upstream of the upstream seat 20A exerts pressure against the seat 20A and leaks past the rear flexible seal 88 and metal radial sealing surfaces 90, 92, as described above in FIG. 5, encounters the peripheral seal 112. The fluid flowing in this direction collapses the arms toward each other and leaks past the peripheral seal 112 and into the bonnet cavity 108 to stabilize the pressures that the pressure P2 is approximately equal to the pressure P1. The left side of the bonnet cavity 108 illustrated in FIG. 8 is fluidicly coupled to the right side of the bonnet cavity 108, so that fluid at pressure P2 encounters the downstream seat 20B. As the fluid passes between an annulus created between the outer periphery of the seat 20B and the bore 52 of the seat pocket, the fluid encounters the peripheral seal 1 12. However, from this direction, the fluid at the pressure P2 energizes the arms 122, 124 of the seal 112 by forcing them away from each other and forces the seat 20B against the wall of the peripheral step 72 on one side and the back face 54 of the other side. The arms seal so that the fluid at pressure P2 does not leak past the peripheral seal 112. If any fluid leaks past the seal 112, it encounters the metal radial sealing surface 90 which seals in a metal-to-metal fashion against the back face 54 by the fluid at pressure P2, forcing the seat against the back face 54. Further, any fluid leaking past the metal-to-metal seal created by the metal radial sealing surface 90 further encounters the rear flexible seal 88. The rear flexible seal 88 on the downstream seat 20B is pressed against the back face 54 and seals against the back face 54. Further, the other metal radial sealing surface 92 creates a seal against the back face 54, as the seat 20B is pressed against the back face 54. Thus, the seat 20B in one embodiment includes four sealing surfaces to help prevent leakage of fluids downstream of the seat 20B.

Thus, the system intentionally allows fluid to flow past an upstream seat (such as 20A in the above example) and conversely seal when flowing past a downstream seat (such as 20B in the above example). If the flow 110 was reversed, the seat 20B would become the upstream seat and would allow pressures to stabilize by allowing fluid to seep past the seals in a downstream position, and the seat 20A would be downstream and seal the fluid from leaking past the seat with its respective seals.

Figure 9:
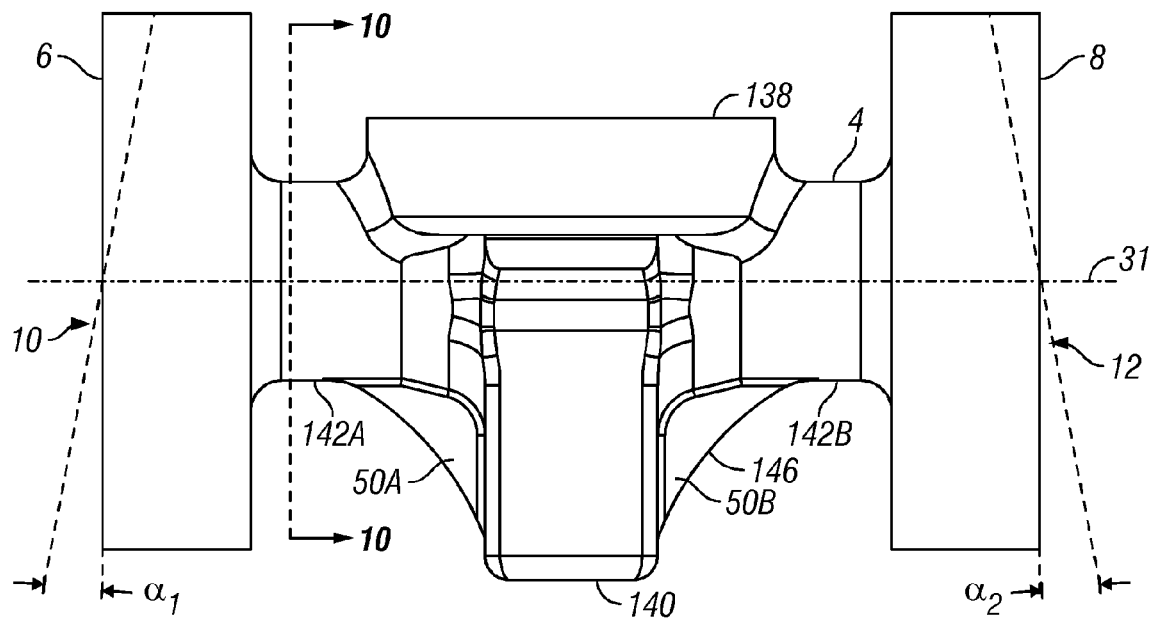
FIG. 9 is a schematic side view of the valve body illustrating ribs.
Figure 10:
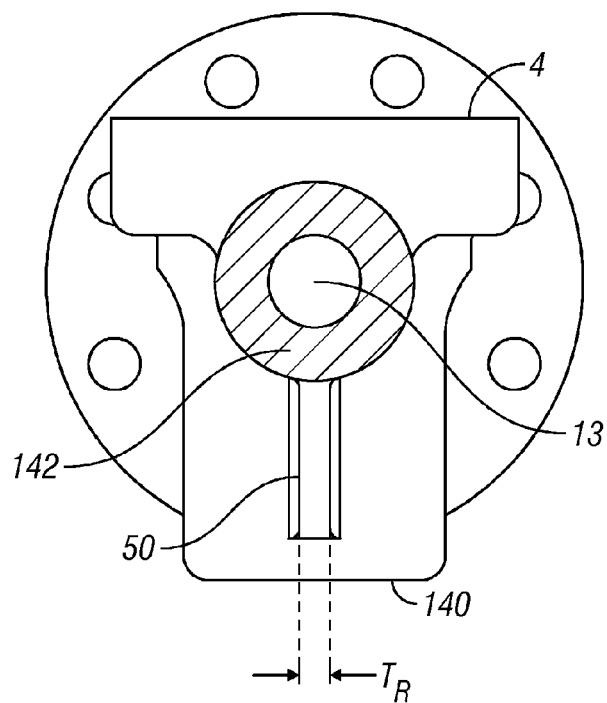
FIG. 10 is a schematic partial cross-sectional view from an end illustrating the ribs.
Figure 11:
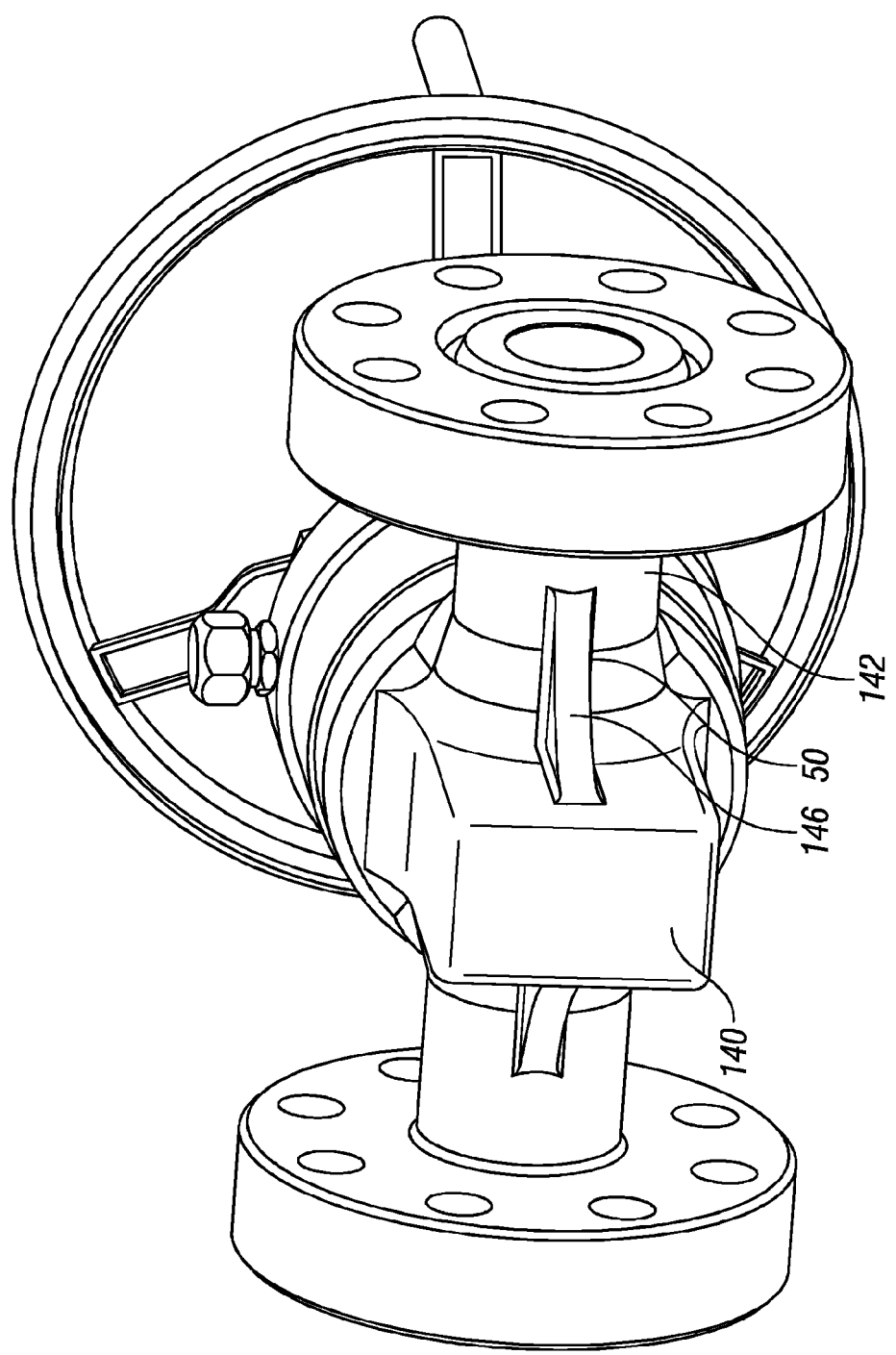
FIG. 11 is a schematic bottom perspective view of the valve body of FIGS. 9 and 10.

FIG. 9 is a schematic side view of the valve body illustrating ribs. FIG. 10 is a schematic partial cross-sectional view from an end illustrating the ribs. FIG. 11 is a schematic bottom perspective view of the valve body of FIGS. 9 and 10. The figures will be described in conjunction with each other. The valve body 4 is generally a nonsymmetrical valve body between the upper portion and the lower portion relative to the centerline 31 of the flow passage 13. The nonsymmetrical nature of the valve is generally due to the bonnet being coupled to the upper portion in which additional material is unnecessary and would otherwise add to the cost. Thus, the valve body portion 138 adjacent the bonnet has less material than the valve body portion 140 distal from the bonnet. Since the valve body portion 138 has less material, the valves and particularly the ends, flexes in a non-coplanar fashion when pressurized, so that the flanges 6, 8 bend at angles $\alpha_1$ and $\alpha_2$ relative to their orientation in a nonpressurized state. The nonsymmetrical portions of the valve cause the valves ends when the valve is under pressure to be deformed by being nonsymetrically stressed. Such movement (engineering "strain") is calculable due to stress-strain curves at given stress levels for given metals. If the connections to other equipment are sufficiently rigid, the connections may reduce the deflection. However, the valve is in a strained condition.

Typical valve engineering practices would dictate adding a significant amount of bulk material to the valve to be able to withstand the stress and strain. However, as discussed above, the additional bulk material adds significant cost as well. In contrast to the typical engineering practice, the inventors realize that selective positioning of relatively thin, minute amounts of material could make a significant difference in the overall stiffness and rigidity of the valve body. Thus, in contrast to standard engineering practice, the valve disclosed herein can add one or more ribs 50A, 50B (collectively, ribs 50) to the valve body to provide sufficient rigidity for the elevated pressures, and still retain a lower material cost than in standard engineering practice. More specifically, the valve having a valve body portion 142A external to the flow passage 13 can have a rib 50A coupled between the valve body portion 140 and the valve body portion 142A. Similarly, the valve can have a rib 50B disposed between the valve body portion 140 and the valve body portion 142B external to the flow passage 13.

As shown in FIG. 9, the ribs 50 can have an angled surface 146 between the valve body portion 140 and the valve body portions 142A, 142B. The term "angled" is used broadly and includes sloped and curved surfaces. In some embodiments, the rib can have an opening formed therethrough to lessen the material and weight, depending on manufacturing.

As shown in FIG. 10, the rib 50 can have a rib thickness $T_R$. In the embodiment shown, the rib thickness can be a consistent thickness other than allowances for radii where the ribs join the valve body passage 142 or other transitions. In other embodiments, the rib thickness can vary, depending on manufacturing complexities and costs.

Figure 12:
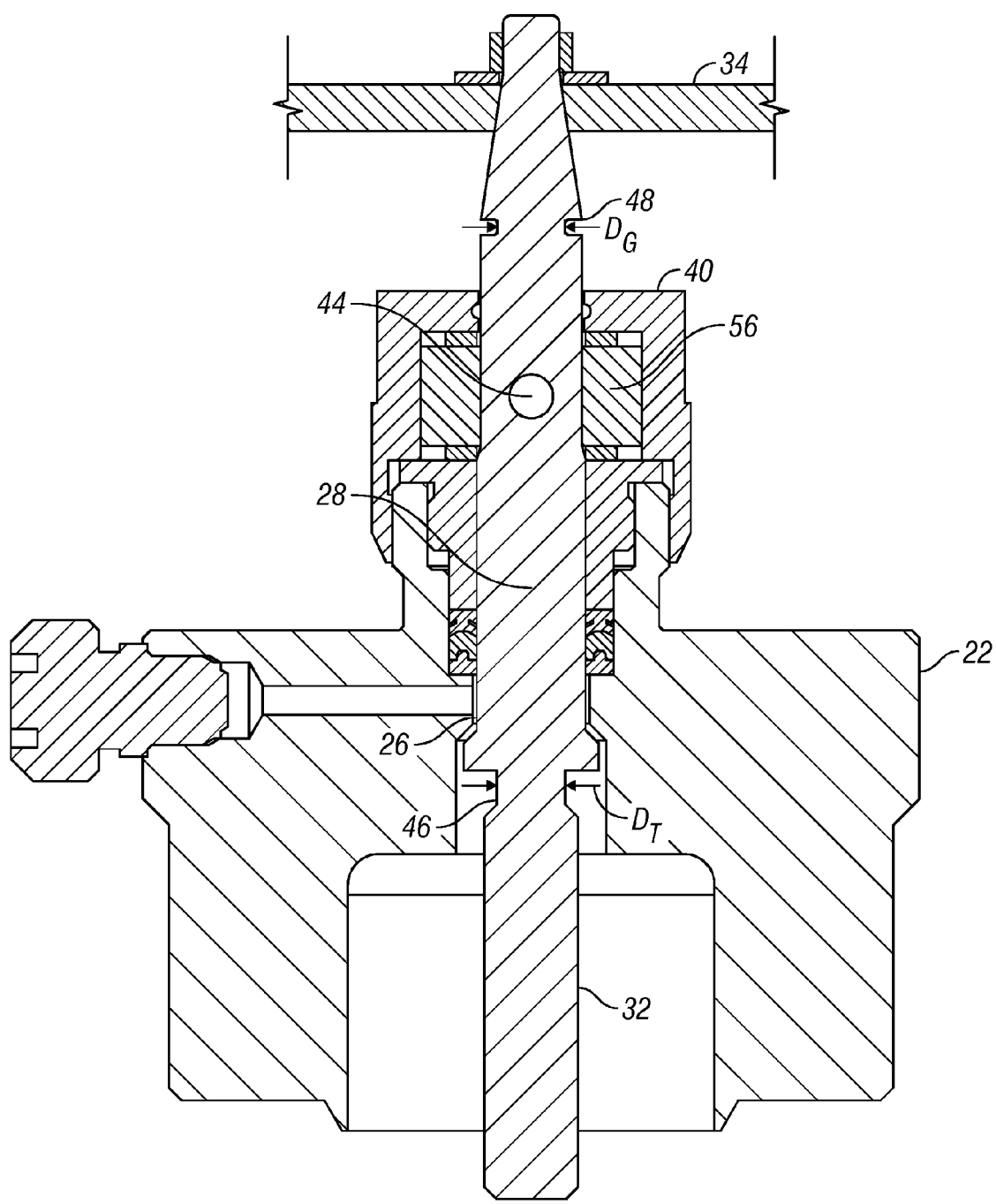
FIG. 12 is a schematic cross-sectional view of the valve bonnet with a stem assembled therein.

FIG. 12 is a schematic cross-sectional view of the valve bonnet with a stem assembled therein. The bonnet 22 includes an opening 26 through which the stem 28 can be inserted. The stem 28 is threadably coupled to the gate 30 as described above for actuating the gate up and down in the gate cavity 16 by rotating the stem 28 by an actuator 34. Under certain conditions, the stem 28 can be overstressed and fail, generally by excess torque from the actuator 34, creating a shear failure. A shear pin 44 coupled from the stem 28 to a bearing 56 provides a protective mechanism to overstressing the stem and possibly breaking the stem at a less desirable location. However, sometimes, the shear pin can be replaced with an improperly rated shear pin and not shear, and the stem can be sheared at a weak point. One weak point is a thread relief 46 that is created in forming the threads 32 along the portion of the stem that engages the gate described above. If the stem fails at the thread relief 46, the valve is generally taken offline and dissembled which could interrupt production flow and create a significant expenditure. Thus, the inventors have provided another safety device that supplements the shear pin 44. Specifically, the stem 28 in at least one embodiment can provide a weakened point in the stem at a stem groove 48. The stem groove 48 is formed external to the bonnet 22 and generally external to the cap 40 of the bonnet. If the stem fails to shear the shear pin when excess torque is applied, it can shear at the thread groove 48 instead of the thread relief 46. If the stem shears at the stem groove 48, there can still be sufficient length on the stem 28 external to the bonnet to be engaged by a pipe wrench or other device for rotating the valve, independent of the actuator 34. In general, the diameter $D_G$ of the stem groove 48 will be less than the diameter $D_T$ of the thread relief 46, so that the smaller and weaker cross-section will be the thread groove 48. More specifically, the stem groove 48 establishes a smaller cross-sectional area in the stem 28 than a cross-sectional area at a thread relief 46 on the stem. In turn, the cross-sectional area of the stem groove 28 has a greater shear strength than a shear strength of the shear pin 44 inserted through the stem. Thus, the shear pin should fail first, then the stem groove 48, and both fail before the thread relief 46 fails.

Figure 13:
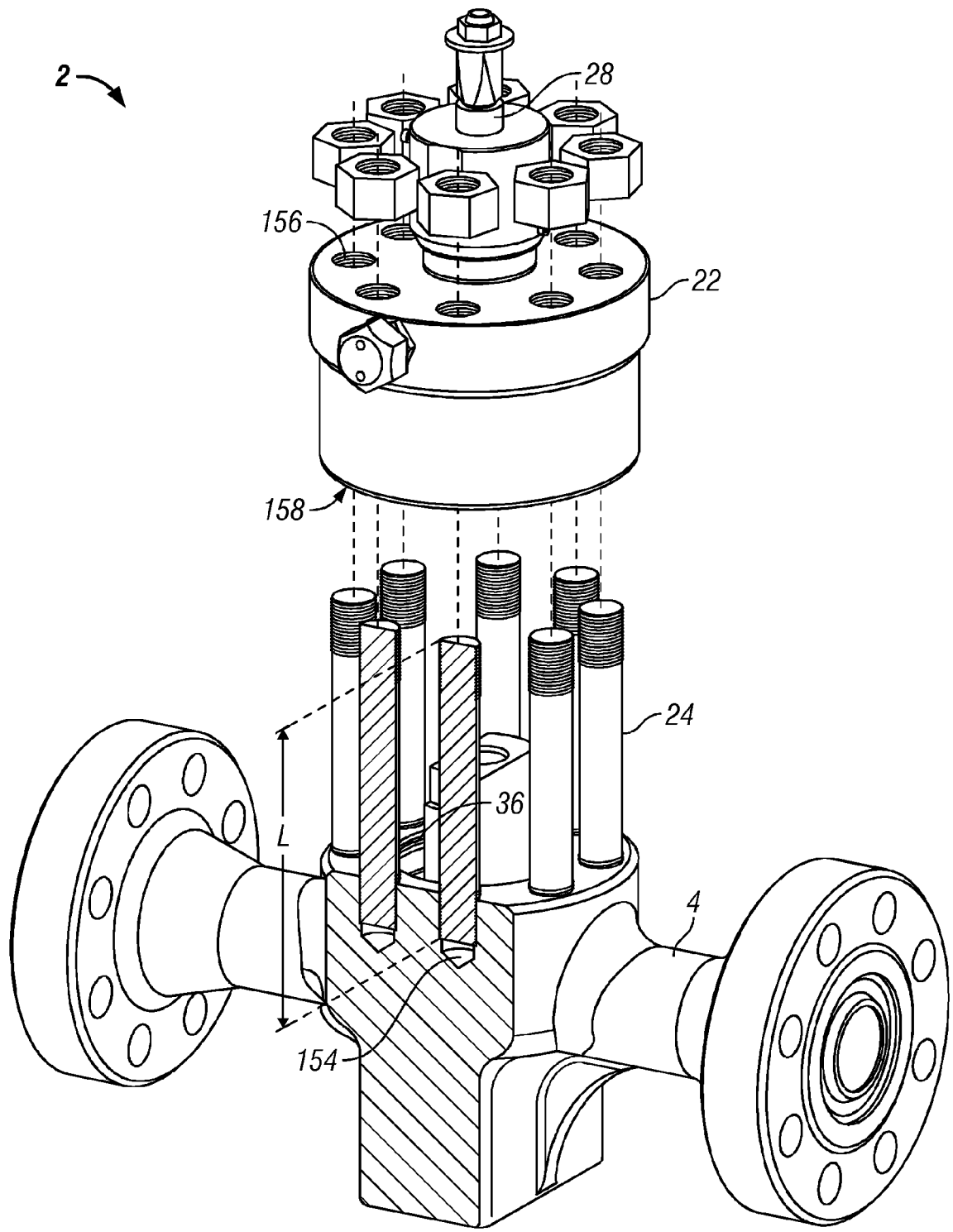
FIG. 13 is a schematic top perspective assembly view of the valve body and valve bonnet with extended bonnet bolts.

FIG. 13 is a schematic top perspective assembly view of the valve body and valve bonnet with extended bonnet bolts. An additional feature of an embodiment of the valve disclosed herein is the use of significantly longer bonnet bolts to act as metal "springs" on the bonnet-to-body seal 36. It is typical that a bonnet bolt will be a relatively short, stubby bolt. The inventors have realized as an added advantage to the design shown herein, that a much longer bonnet bolt can be used as a mechanical "spring" to maintain pressure under varying conditions on the bonnet-to-body seal 36. Specifically, the length L of the bonnet bolt 24 can be multiples of length of a standard bonnet bolt. In at least one embodiment, the length L of the bonnet bolt 24 can be 2× to 6×, and more preferably 4×, of a standard length of bonnet bolt. The invention can use the modulus of elasticity (Young's Modulus) of a stress-strain curve for the particular metal to determine that under a given stress, the metal will be deformed a certain length ("strained") and thus stretched to create a metal "spring" that can absorb varying stresses and still maintain a tight seal on the bonnet-to-body seal 36. A longer bolt can accommodate a longer strain for a given stress and effectively operate more as a spring with a lower spring constant for increased flexibility in sealing to the bonnet-to-body seal 36.

The bolts are generally coupled to valve body bolt holes 154 in the valve body 4. The bonnet 22 can be assembled with the stem 28 and other associated components, and inserted over the bonnet bolts 24, so that the bolts travel through bonnet bolt holes 156. The bonnet bolts are then pre-stressed to a certain torque using nuts and other fasteners, so that the bolts are strained (that is, stretched in tension) for a given stress in an elastic engineering mode without incurring plastic permanent deformation. The engineering strain creates a "spring" loaded force on the lower bonnet sealing surface 158, also shown in cross-sectional view in FIG. 1. The lower bonnet sealing surface 158 engages the bonnet-to-body seal 36 that creates a tight seal between the bonnet 22 and the valve body 4 under varying stress loads.

Other and further embodiments utilizing one or more aspects of the inventions described above can be devised without departing from the spirit of the invention. For example, the cables could be chains, the motive forces could be gears and sprockets, and other variations. Further, the various methods and embodiments of the translating movement that shifts the pile and launches the piles can be included in combination with each other to produce variations of the disclosed methods and embodiments. Discussion of singular elements can include plural elements and vice-versa.

The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions.

Unless the context requires otherwise, the word "comprise" or variations such as "comprises" or "comprising," should be understood to imply the inclusion of at least the stated element or step or group of elements or steps or equivalents thereof, and not the exclusion of a greater numerical quantity or any other element or step or group of elements or steps or equivalents thereof. The term "couple", "coupled," "coupling," "coupler," and like terms are used broadly herein and may include any method or device for securing, binding, bonding, fastening, attaching, joining, inserting therein, forming thereon or therein, communicating, or otherwise associating, for example, mechanically, magnetically, electrically, chemically, directly or indirectly with intermediate elements, one or more pieces of members together and may further include without limitation integrally forming one functional member with another in a unity fashion. The coupling may occur in any direction, including rotationally.

The systems and methods herein have been described in the context of various embodiments and not every embodiment has been described. Apparent modifications and alterations to the described embodiments are available to those of ordinary skill in the art. The disclosed and undisclosed embodiments are not intended to limit or restrict the scope or applicability of the concepts of the Applicants, but rather, in conformity with the patent laws, Applicants intend to protect all such modifications and improvements to the full extent that such falls within the scope or range of equivalent of the following claims.

Further, any references mentioned in the application for this patent, as well as all references listed in the information disclosure originally filed with the application, are hereby incorporated by reference in their entirety to the extent such may be deemed essential to support the enabling of the concept. However, to the extent statements might be considered inconsistent with the patenting of the concept, such statements are expressly not meant to be considered as made by the Applicant(s).

The invention claimed is:

1. A gate valve, comprising:
    a valve body having a flow passage from a first port to a second port with a gate cavity disposed between the first port and the second port, the gate cavity intersecting the flow passage;
    a valve bonnet coupled to the valve body with a bonnet opening;
    a gate slidably coupled to the valve body in the gate cavity, the gate adapted to slidably move at an angle to a centerline of the flow passage to block the flow when the gate is in a closed position to cover a cross-sectional area of the flow passage and allow flow when the gate is at least in a partially open position when the gate does not entirely cover the cross-sectional area of the flow passage;
    a stem rotatably coupled through the bonnet opening to the gate and adapted to move the gate reciprocally across the cross-sectional area of the flow passage between the closed and open positions;
    a seat pocket disposed on each side of the gate cavity in the valve body, the seat pocket having a bore that forms an outer perimeter of the seat pocket and a back face in the valve body distal from the gate cavity to create a stepped surface around the flow passage; and
    a seat disposed in each seat pocket and adapted to seal between the gate and the valve body, comprising:
        a seat body having:
            a flow opening aligned with the flow passage;
            a gate face disposed toward the gate;
            a perimeter surface adapted to fit into the bore of the seat pocket; and
            a rear face disposed toward the back face of the seat pocket, the rear face having a shaped first metal radial sealing surface adapted to seal against the back face of the seat pocket in metal-to-metal contact.

2. The gate valve of claim 1, wherein the rear face further comprises a second metal radial sealing surface adapted to seal against the back face in metal-to-metal contact.

3. The gate valve of claim 2, wherein the perimeter surface of the seat body comprises a peripheral groove extending toward a centerline of the seat body, and the seat further comprising a flexible castellated seal disposed in the peripheral groove, the castellated seal having a series of castellations on a first face, the first face being disposed toward the gate face of the seat body of the seat.

4. The gate valve of claim 1, wherein the seat further comprises a flexible castellated seal disposed in the peripheral groove of the seat body, the castellated seal having a series of castellations on a first face, the first face being disposed toward the gate face of the seat body of the seat.

5. The gate valve of claim 1, wherein the rear face comprises a rear cylindrical groove and further comprising a rear flexible seal disposed in the rear cylindrical groove of the rear face and adapted to seal against the back face of the seat pocket.

6. The gate valve of claim 1, wherein the valve body comprises at least two ribs extending from a portion of the valve body distant from the valve bonnet to a portion of the valve body external to the flow passage, a first rib being disposed toward the first port and a second rib being disposed toward the second port.

7. The gate valve of claim 6, wherein the ribs form an angled surface disposed from a central portion of the valve body toward the first port and the second port at an angle to a centerline through the first port and second port.

8. The gate valve of claim 1, wherein the valve stem comprises a groove establishing a smaller cross-sectional area in the stem than a cross-sectional area at a thread relief on the stem, the groove cross-sectional area being greater than a cross-sectional area of a shear pin inserted through the stem.

9. The gate valve of claim 8, wherein the valve stem groove is disposed externally to the valve bonnet when the stem is rotatably coupled through the bonnet opening to the gate.

10. The gate valve of claim 1, wherein the gate face comprises a gate cylindrical groove formed in the gate face, and further comprising a gate flexible seal disposed in the cylindrical groove of the gate face and adapted to seal against the gate.

11. A gate valve, comprising:
a valve body having a flow passage from a first port to a second port with a gate cavity disposed between the first port and the second port, the gate cavity intersecting the flow passage, the valve body further comprising at least two ribs extending from a portion of the valve body distant from the valve bonnet to a portion of the valve body external to the flow passage, a first rib being disposed toward the first port and a second rib being disposed toward the second port;
a valve bonnet coupled to the valve body with a bonnet opening;
a gate slidably coupled to the valve body in the gate cavity, the gate adapted to slidably move at an angle to the centerline of the flow passage to block the flow when the gate is in a closed position to cover a cross-sectional area of the flow passage and allow flow when the gate is at least in a partially open position when the gate does not entirely cover the cross-sectional area of the flow passage;
a stem rotatably coupled through the bonnet opening to the gate and adapted to move the gate reciprocally across the cross-sectional area of the flow passage between the closed and open positions;
a seat pocket disposed on each side of the gate cavity in the valve body, the seat pocket having a bore that forms an outer perimeter of the seat pocket and a back face in the valve body distal from the gate cavity to create a stepped surface around the flow passage; and
a seat disposed in each seat pocket and adapted to seal between the gate and the valve body.

12. The gate valve of claim 11, wherein the ribs form an angled surface from a central portion of the valve body toward the first port and the second port at an angle to a centerline through the first port and second port.

13. The gate valve of claim 11, wherein the seat comprises:
a seat body having:
a flow opening aligned with the flow passage;
a gate face disposed toward the gate;
a perimeter surface adapted to fit into the bore of the seat pocket;
a rear face disposed toward the back face of the seat pocket, the rear face comprising a first metal radial sealing surface adapted to seal against the back face in metal-to-metal contact.

14. The gate valve of claim 13, wherein the rear face further comprises a second metal radial sealing surface adapted to seal against the back face in metal-to-metal contact, wherein at least one of the metal radial sealing surfaces comprises a shaped sealing surface.

15. The gate valve of claim 13, wherein the perimeter surface of the seat body comprises a peripheral groove extending toward a centerline of the seat body, and the seat further comprising a flexible castellated seal disposed in the peripheral groove, the castellated seal having a series of castellations on a first face, the first face being disposed toward the gate face of the seat body of the seat, the flexible castellated seal.

16. The gate valve of claim 11, wherein the rear face comprises a rear cylindrical groove and further comprising a rear flexible seal disposed in the rear cylindrical groove of the rear face and adapted to seal against the back face of the seat pocket.

17. The gate valve of claim 11, wherein the gate face comprises a gate cylindrical groove formed in the gate face, and further comprising a gate flexible seal disposed in the cylindrical groove of the gate face and adapted to seal against the gate.

18. The gate valve of claim 11, wherein the valve stem comprises a groove establishing a smaller cross-sectional area in the stem than a cross-sectional area at a thread relief on the stem, the groove cross-sectional area having a greater shear strength than a shear strength of a shear pin inserted through the stem.

19. The gate valve of claim 18, wherein the valve stem groove is disposed externally to the valve bonnet when the stem is rotatably coupled through the bonnet opening to the gate.

20. A gate valve, comprising:
a valve body having a flow passage from a first port to a second port with a gate cavity disposed between the first port and the second port, the gate cavity intersecting the flow passage;
a valve bonnet coupled to the valve body with a bonnet opening;
a gate slidably coupled to the valve body in the gate cavity, the gate adapted to slidably move at an angle to a centerline of the flow passage to block the flow when the gate is in a closed position to cover a cross-sectional area of the flow passage and allow flow when the gate is at least in a partially open position when the gate does not entirely cover the cross-sectional area of the flow passage;
a stem rotatably coupled through the bonnet opening to the gate and adapted to move the gate reciprocally across the cross-sectional area of the flow passage between the closed and open positions;
a seat pocket disposed on each side of the gate cavity in the valve body, the seat pocket having a bore that forms an outer perimeter of the seat pocket and a back face in the valve body distal from the gate cavity to create a stepped surface around the flow passage; and
a seat disposed in each seat pocket and adapted to seal between the gate and the valve body, comprising:
a seat body having:
a flow opening aligned with the flow passage;
a gate face disposed toward the gate;
a perimeter surface adapted to fit into the bore of the seat pocket, the perimeter surface having a peripheral groove extending toward a centerline of the seat body;
a rear face disposed toward the back face of the seat pocket; and
a flexible castellated seal disposed in the peripheral groove of the seat body, the castellated seal having a series of castellations on a first face, the first face being disposed toward the gate face of the seat body of the seat.

21. The gate valve of claim 20, wherein the rear face comprises a first metal radial sealing surface adapted to seal against the back face of the seat pocket in metal-to-metal contact.

22. The gate valve of claim 21, wherein the rear face further comprises a second metal radial sealing surface adapted to seal against the back face in metal-to-metal contact, wherein at least one of the metal radial sealing surfaces comprises a shaped sealing surface.

23. The gate valve of claim 20, wherein the rear face comprises a rear cylindrical groove and further comprising a rear flexible seal disposed in the rear cylindrical groove of the rear face and adapted to seal against the back face of the seat pocket.

24. The gate valve of claim 20, wherein the gate face comprises a gate cylindrical groove formed in the gate face, and further comprising a gate flexible seal disposed in the cylindrical groove of the gate face and adapted to seal against the gate.

25. A gate valve, comprising:
a valve body having a flow passage from a first port to a second port with a gate cavity disposed between the first port and the second port, the gate cavity intersecting the flow passage, the valve body further comprising at least two ribs extending from a portion of the valve body distant from the valve bonnet to a portion of the valve body external to the flow passage, a first rib being disposed toward the first port and a second rib being disposed toward the second port, wherein the ribs form an angled surface from a central portion of the valve body toward the first port and the second port at an angle to a centerline through the first port and second port;
a valve bonnet coupled to the valve body with a bonnet opening;
a gate slidably coupled to the valve body in the gate cavity, the gate adapted to slidably move at an angle to the centerline of the flow passage to block the flow when the gate is in a closed position to cover a cross-sectional area of the flow passage and allow flow when the gate is at least in a partially open position when the gate does not entirely cover the cross-sectional area of the flow passage;
a stem rotatably coupled through the bonnet opening to the gate and adapted to move the gate reciprocally across the cross-sectional area of the flow passage between the closed and open positions;
a seat pocket disposed on each side of the gate cavity in the valve body, the seat pocket having a bore that forms an outer perimeter of the seat pocket and a back face in the valve body distal from the gate cavity to create a stepped surface around the flow passage; and
a seat disposed in each seat pocket and adapted to seal between the gate and the valve body, comprising:
a seat body having:
a flow opening aligned with the flow passage;
a gate face disposed toward the gate;
a perimeter surface adapted to fit into the bore of the seat pocket, the perimeter surface having a peripheral groove extending toward a centerline of the seat body;
a rear face disposed toward the back face of the seat pocket, the rear face comprising a rear cylindrical groove and a first metal radial sealing surface formed on the rear face adjacent the rear cylindrical groove, the first metal radial sealing surface being adapted to seal against the back face in metal-to-metal contact as a first seal, and the rear face further comprising a second metal radial sealing surface formed on the rear face adjacent the rear cylindrical groove and distal from the first metal radial sealing surface relative to the rear cylindrical groove, the second metal radial sealing surface adapted to seal against the back face in metal-to-metal contact as a second seal, wherein at least one of the metal radial sealing surfaces comprises a shaped sealing surface; and
a peripheral step formed in the perimeter surface adjacent the rear face;
a rear flexible seal disposed in the cylindrical groove of the rear face and adapted to seal against the back face as a third seal; and
a flexible castellated seal disposed in the peripheral groove of the seat body, the castellated seal having a series of castellations on a first face, the first face being disposed toward the gate face of the seat body of the seat, the flexible castellated seal forming a fourth seal.

26. The gate valve of claim 25, wherein the gate face comprises a gate cylindrical groove formed in the gate face, and further comprising a gate flexible seal disposed in the cylindrical groove of the gate face and adapted to seal against the gate.

27. A gate valve, comprising:
a valve body having a flow passage from a first port to a second port with a gate cavity disposed between the first port and the second port, the gate cavity intersecting the flow passage;
a valve bonnet coupled to the valve body with a bonnet opening;
a gate slidably coupled to the valve body in the gate cavity, the gate adapted to slidably move at an angle to a centerline of the flow passage to block the flow when the gate is in a closed position to cover a cross-sectional area of the flow passage and allow flow when the gate is at least in a partially open position when the gate does not entirely cover the cross-sectional area of the flow passage;
a stem rotatably coupled through the bonnet opening to the gate and adapted to move the gate reciprocally across the cross-sectional area of the flow passage between the closed and open positions;
a seat pocket disposed on an upstream side and a downstream side of the gate cavity in the valve body, the seat pocket having a bore that forms an outer perimeter of the seat pocket and a back face in the valve body distal from the gate cavity to create a stepped surface around the flow passage; and
a seat disposed in each seat pocket and adapted to seal between the gate and the valve body, comprising:
a seat body having:
a flow opening aligned with the flow passage;
a gate face disposed toward the gate;
a perimeter surface adapted to fit into the bore of the seat pocket;
a rear face disposed toward the back face of the seat pocket; and
a peripheral step formed in the perimeter surface adjacent the rear face; and
a flexible peripheral seal disposed around the peripheral step formed in the perimeter surface, comprising:

a jacket having a heel portion of flexible material of a longitudinal thickness and a groove formed in an outer periphery of the jacket, having at least two peripherally extending seal arms; and a peripheral spring disposed in the jacket groove, the peripherally extending seal arms being biased to a width, measured from an outside surface of one seal arm to an outside surface of the other seal arm, that is greater than the heel longitudinal thickness wherein the peripheral seal with the peripherally extending seal arms disposed around the peripheral step formed in the perimeter surface is configured to allow pressurized fluid to pass by the seal arms on the upstream side of the gate cavity and to be sealed by the seal arms on the downstream side of the gate cavity.

28. The gate valve of claim 27, wherein the rear face comprises a first metal radial sealing surface adapted to seal against the back face of the seat pocket in metal-to-metal contact.

29. The gate valve of claim 28, wherein the rear face further comprises a second metal radial sealing surface adapted to seal against the back face in metal-to-metal contact, wherein at least one of the metal radial sealing surfaces comprises a shaped sealing surface.

30. The gate valve of claim 27, wherein the valve body comprises at least two ribs extending from a portion of the valve body distant from the valve bonnet to a portion of the valve body external to the flow passage, a first rib being disposed toward the first port and a second rib being disposed toward the second port.

31. The gate valve of claim 30, wherein the ribs form an angled surface from a central portion of the valve body toward the first port and the second port at an angle to a centerline through the first port and second port.

32. The gate valve of claim 27, wherein the valve stem comprises a groove establishing a smaller cross-sectional area in the stem than a cross-sectional area at a thread relief on the stem, the groove cross-sectional area having a greater shear strength than a shear strength of a shear pin inserted through the stem.

33. The gate valve of claim 32, wherein the valve stem groove is disposed externally to the valve bonnet when the stem is rotatably coupled through the bonnet opening to the gate.

34. The gate valve of claim 27, wherein the rear face comprises a rear cylindrical groove and further comprising a rear flexible seal disposed in the rear cylindrical groove of the rear face and adapted to seal against the back face of the seat pocket.

35. A gate valve, comprising:
a valve body having a flow passage from a first port to a second port with a gate cavity disposed between the first port and the second port, the gate cavity intersecting the flow passage, the valve body further comprising at least two ribs extending from a portion of the valve body distant from the valve bonnet to a portion of the valve body external to the flow passage, a first rib being disposed toward the first port and a second rib being disposed toward the second port, wherein the ribs form an angled from a central portion of the valve body toward the first port and the second port at an angle to a centerline through the first port and second port;

a valve bonnet coupled to the valve body with a bonnet opening;

a gate slidably coupled to the valve body in the gate cavity, the gate adapted to slidably move at an angle to the centerline of the flow passage to block the flow when the gate is in a closed position to cover a cross-sectional area of the flow passage and allow flow when the gate is at least in a partially open position when the gate does not entirely cover the cross-sectional area of the flow passage;

a stem rotatably coupled through the bonnet opening to the gate and adapted to move the gate reciprocally across the cross-sectional area of the flow passage between the closed and open positions;

a seat pocket disposed on each side of the gate cavity in the valve body, the seat pocket having a bore that forms an outer perimeter of the seat pocket and a back face in the valve body distal from the gate cavity to create a stepped surface around the flow passage; and a seat disposed in each seat pocket and adapted to seal between the gate and the valve body, comprising:
a seat body having:
a flow opening aligned with the flow passage;
a gate face disposed toward the gate;
a perimeter surface adapted to fit into the bore of the seat pocket, the perimeter surface having a peripheral step formed in the perimeter surface adjacent the rear face;
a rear face disposed toward the back face of the seat pocket, the rear face comprising a rear cylindrical groove and a first metal radial sealing surface formed on the rear face adjacent the rear cylindrical groove and adapted to seal against the back face in metal-to-metal contact as a first seal, and the rear face further comprising a second metal radial sealing surface formed on the rear face adjacent the rear cylindrical groove and distal from the first metal radial sealing surface relative to the rear cylindrical groove, the second metal radial sealing surface adapted to seal against the back face in metal-to-metal contact as a second seal, wherein at least one of the metal radial sealing surfaces comprises a shaped sealing surface; and
a rear flexible seal disposed in the cylindrical groove of the rear face and adapted to seal against the back face as a third seal; and
a flexible peripheral seal disposed around the peripheral step formed in the perimeter surface adjacent the rear surface, the flexible peripheral seal forming a fourth seal and comprising:
a jacket having a heel portion of flexible material of a longitudinal thickness and a groove formed in an outer periphery of the jacket, having at least two peripherally extending seal arms; and
a peripheral spring disposed in the jacket groove, the peripherally extending seal arms being biased to a width, measured from an outside surface of one seal arm to an outside surface of the other seal arm, that is greater than the heel longitudinal thickness.

36. The gate valve of claim 35, wherein the gate face comprises a gate cylindrical groove formed in the gate face, and further comprising a gate flexible seal disposed in the cylindrical groove of the gate face and adapted to seal against the gate.

* * * * *